US009997808B2

(12) United States Patent
Bradwell et al.

(10) Patent No.: US 9,997,808 B2
(45) Date of Patent: *Jun. 12, 2018

(54) LIQUID METAL ALLOY ENERGY STORAGE DEVICE

(71) Applicant: Massachusetts Institute of Technology, Cambridge, MA (US)

(72) Inventors: David J. Bradwell, Arlington, MA (US); Gerbrand Ceder, Wellesley, MA (US); Luis Ortiz, Natick, MA (US); Donald R. Sadoway, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 271 days.

This patent is subject to a terminal disclaimer.

(21) Appl. No.: 14/755,685

(22) Filed: Jun. 30, 2015

(65) Prior Publication Data

US 2015/0303525 A1    Oct. 22, 2015

Related U.S. Application Data

(63) Continuation of application No. 12/839,130, filed on Jul. 19, 2010, now Pat. No. 9,076,996, which is a (Continued)

(51) Int. Cl.
*H01M 2/02*    (2006.01)
*H01M 2/04*    (2006.01)
(Continued)

(52) U.S. Cl.
CPC ....... *H01M 10/399* (2013.01); *H01M 2/0252* (2013.01); *H01M 2/0447* (2013.01);
(Continued)

(58) Field of Classification Search
CPC ............ H01M 2/0252; H01M 2/0456; H01M 2/1094; H01M 2/12; H01M 2/0447;
(Continued)

(56) References Cited

U.S. PATENT DOCUMENTS 3,238,437 A    3/1966 Foster et al.
3,245,836 A    4/1966 Agruss
(Continued)

FOREIGN PATENT DOCUMENTS

EP    0078404 A2    5/1983 ............ H01M 14/00
EP    0327959       8/1989 ............ H01M 10/14
(Continued)

OTHER PUBLICATIONS

Allanore, "A new anode material for oxygen evolution in molten oxide electrolysis," Nature, vol. 497, pp. 353-356, May 16, 2013.
(Continued)

*Primary Examiner* — Sean P Cullen
(74) *Attorney, Agent, or Firm* — Sunstein Kann Murphy & Timbers LLP

(57) ABSTRACT

An energy storage device configured to exchange energy with an external device includes a container having walls, a lid covering the container and having a safety pressure valve, a negative electrode disposed away from the walls of the container, a positive electrode in contact with at least a portion of the walls of the container, and an electrolyte contacting the negative electrode and the positive electrode at respective electrode/electrolyte interfaces. The negative electrode, the positive electrode and the electrolyte include separate liquid materials within the container at an operating temperature of the battery.

27 Claims, 19 Drawing Sheets

Related U.S. Application Data continuation-in-part of application No. 12/505,937, filed on Jul. 20, 2009, now Pat. No. 8,323,816.

(51) Int. Cl.

| | |
|---|---|
| H01M 2/06 | (2006.01) |
| H01M 2/30 | (2006.01) |
| H01M 4/24 | (2006.01) |
| H01M 4/36 | (2006.01) |
| H01M 4/70 | (2006.01) |
| H01M 10/24 | (2006.01) |
| H01M 10/26 | (2006.01) |
| H01M 10/39 | (2006.01) |
| H01M 2/10 | (2006.01) |
| H01M 4/38 | (2006.01) |
| H01M 4/46 | (2006.01) |
| H01M 4/66 | (2006.01) |
| H01M 10/654 | (2014.01) |
| H01M 10/6554 | (2014.01) |
| H01M 10/617 | (2014.01) |
| H01M 10/658 | (2014.01) |
| H01M 2/12 | (2006.01) |
| H01M 4/134 | (2010.01) |
| H01M 4/76 | (2006.01) |
| H01M 10/6571 | (2014.01) |
| H01M 4/02 | (2006.01) |

(52) U.S. Cl.
CPC ....... *H01M 2/0456* (2013.01); *H01M 2/1094* (2013.01); *H01M 2/12* (2013.01); *H01M 4/134* (2013.01); *H01M 4/38* (2013.01); *H01M 4/381* (2013.01); *H01M 4/387* (2013.01); *H01M 4/466* (2013.01); *H01M 4/662* (2013.01); *H01M 4/70* (2013.01); *H01M 10/617* (2015.04); *H01M 10/654* (2015.04); *H01M 10/658* (2015.04); *H01M 10/6554* (2015.04); *H01M 4/661* (2013.01); *H01M 4/663* (2013.01); *H01M 4/76* (2013.01); *H01M 10/6571* (2015.04); *H01M 2004/027* (2013.01); *H01M 2300/0054* (2013.01); *H01M 2300/0057* (2013.01)

(58) Field of Classification Search
CPC ........ H01M 4/38; H01M 4/381; H01M 4/466; H01M 4/662; H01M 4/70; H01M 4/387; H01M 4/134; H01M 10/399; H01M 10/654; H01M 10/6554; H01M 10/617; H01M 10/658
USPC .................................................. 429/53, 103
See application file for complete search history.

(56) References Cited

U.S. PATENT DOCUMENTS

| | | | |
|---|---|---|---|
| 3,419,432 A | 12/1968 | Hesson | |
| 3,488,221 A | 1/1970 | Shimotake et al. | |
| 3,503,808 A * | 3/1970 | Nagey | H01M 8/182 429/415 |
| 3,535,214 A | 10/1970 | Winand | 204/64 |
| 3,663,295 A | 5/1972 | Baker | |
| 3,716,409 A | 2/1973 | Cairns et al. | |
| 3,775,181 A | 11/1973 | Ryerson | |
| 3,833,421 A | 9/1974 | Rubischko et al. | |
| 3,933,521 A | 1/1976 | Vissers et al. | |
| 4,011,374 A | 3/1977 | Kaun | |
| 4,216,273 A * | 8/1980 | Cadart | C25C 3/02 429/104 |
| 4,999,097 A | 3/1991 | Sadoway | |
| 5,011,750 A * | 4/1991 | Plichta | H01M 4/40 429/112 |
| 5,185,068 A | 2/1993 | Sadoway | |
| 5,476,733 A | 12/1995 | Coetzer et al. | |
| 6,368,486 B1 | 4/2002 | Thompson et al. | |
| 6,730,210 B2 | 5/2004 | Thompson et al. | |
| 6,733,924 B1 | 5/2004 | Skotheim et al. | |
| 7,504,017 B2 | 3/2009 | Cardarelli | 205/398 |
| 7,678,484 B2 | 3/2010 | Tao et al. | |
| 8,178,231 B2 | 5/2012 | Soloveichik et al. | |
| 8,202,641 B2 | 6/2012 | Winter et al. | |
| 8,460,814 B2 | 6/2013 | Deane et al. | |
| 8,764,962 B2 | 7/2014 | Allanore et al. | 205/398 |
| 9,000,713 B2 | 4/2015 | Boysen et al. | |
| 9,076,996 B2 | 7/2015 | Bradwell et al. | |
| 2007/0215483 A1 | 9/2007 | Johansen et al. | 205/358 |
| 2008/0023321 A1 | 1/2008 | Sadoway | 204/243.1 |
| 2008/0044725 A1 | 2/2008 | Sadoway et al. | |
| 2008/0053838 A1 | 3/2008 | Yamaguchi et al. | |
| 2008/0145755 A1 | 6/2008 | Iacovangelo et al. | |
| 2010/0047671 A1 | 2/2010 | Chiang et al. | |
| 2011/0014503 A1 | 1/2011 | Bradwell et al. | |
| 2011/0014505 A1 | 1/2011 | Bradwell et al. | |
| 2011/0200848 A1 | 8/2011 | Chiang et al. | |
| 2012/0264021 A1 | 10/2012 | Sugiura et al. | |
| 2013/0059176 A1 | 3/2013 | Stefani et al. | |
| 2013/0065122 A1 | 3/2013 | Chiang et al. | |
| 2013/0071306 A1 | 3/2013 | Camp et al. | |
| 2014/0113181 A1 | 4/2014 | Bradwell et al. | |
| 2015/0004455 A1 | 1/2015 | Bradwell et al. | |
| 2015/0015210 A1 | 1/2015 | Bradwell et al. | |
| 2015/0132627 A1 | 5/2015 | Bradwell et al. | |
| 2015/0132628 A1 | 5/2015 | Bradwell et al. | |

FOREIGN PATENT DOCUMENTS

| | | | | |
|---|---|---|---|---|
| EP | 0343333 | | 11/1989 | ............... H01M 2/06 |
| EP | 1096593 | | 5/2001 | ............ H01M 10/48 |
| JP | 55-53877 | | 4/1980 | ............ H01M 10/36 |
| JP | 2001-115369 | | 4/2001 | ............... D04H 1/46 |
| WO | WO 2008/105811 | A2 | 9/2008 | |
| WO | WO 2011/014242 | | 2/2011 | ............... H01M 2/14 |
| WO | WO 2011/014243 | | 2/2011 | ............... H01M 2/14 |
| WO | WO 2014/062706 | | 4/2014 | ............ H01M 10/50 |
| WO | WO 2014/190318 | | 11/2014 | ............ H01M 10/04 |

OTHER PUBLICATIONS

Allanore, "Features and Challenges of Molten Oxide Electrolytes for Metal Extraction," Journal of the Electrochemical Society, vol. 162, No. 1, pp. E13-E22, Nov. 25, 2014.
Bradwell, "Technical and Economic Feasibility of a High-Temperature Self-Assembling Battery," Thesis, Massachusetts Institute of Technology, Department of Materials Science and Engineering, 136 pages, Sep. 2006.
Bradwell "Liquid Metal Batteries: Ambipolar Electrolysis and Alkaline Earth Electroalloying Cells," Thesis, Massachusetts Institute of Technology, Department of Materials Science and Engineering, 206 pages, Feb. 2011.
Bradwell et al. "Recycling ZnTe, CdTe, and Other Compound Semiconductors by Ambipolar Electrolysis," Journal of the American Chemical Society, vol. 133, pp. 19971-19975, Oct. 28, 2011.
Bradwell et al. "Supporting Information: Recycling ZnTe, CdTe, and Other Compound Semiconductors by Ambipolar Electrolysis," Journal of the American Chemical Society, pp. S1-S8, Oct. 28, 2011.
Electroville, Grid-Scale Batteries, ARPA-E, MIT Electroville: High Amperage Energy Storage Device—Energy for the Neighborhood, http://arpa-e.energy.gov/48 q=slick-sheet-project/electroville-grid-scale-batteries, 1 page. Accessed Jul. 2, 2015.
U.S. Department of Energy, U.S. Department of Energy Categorical Exclusion Determination Form, ARPA-E, 25A/1089-Electroville: High-Amperage Energy Storage Device—Energy Storage for the Neighborhood, 2 pages, Jan. 15, 2010.
Kim et al., "Electrolysis of Molten Iron Oxide with an Iridium Anode: The Role of Electrolyte Basicity," Journal of the Electrochemical Society, vol. 158, No. 10, pp. E101-E105, Aug. 5, 2011.

(56) References Cited

OTHER PUBLICATIONS

Kipouros et al., "Toward New Technologies for the Production of Lithium," JOM, pp. 24-26, May 1998.
Sadoway, "The Electrochemical Processing of Refractory Metals," JOM, pp. 15-19, Jul. 1991.
Sadoway, "New opportunities for waste treatment by electrochemical processing in molten salts," Metals and Materials Waste Reduction, Recovery and Remediation, Edited by K.C. Liddell, R.G. Bautista and R.J. Orth, The Minerals, Metals & Materials Society, pp. 73-76, 1994.
Sadoway, "New Opportunities for metals extraction and waste treatment by electrochemical processing in molten salts," J. Mater, Res., vol. 10, No. 3, pp. 487-492, Mar. 1995.
Sadoway, A Technical Feasibility Study of Steelmaking by Molten Oxide Electrolysis, presented at 9th AISI/DOE TRP Industry Briefing Session, 16 pages, Oct. 10, 2007.
Sadoway, "Electrochemical Pathways Towards Carbon-Free Metals Production," presented at GCEP Carbon Management in Manufacturing Industries, 55 pages, Apr. 15, 2008.
Villar, "Assessment of High-Temperature Self-Assembling Battery Implementation based on the Aluminum Smelting Process," Thesis, Massachusetts Institute of Technology, Department of Materials Science and Engineering, 129 pages, Sep. 2010.
U.S. Appl. No. 12/839,130, filed Jul. 19, 2010, now U.S. Pat. No. 9,076,996.
U.S. Appl. No. 12/505,937, filed Jul. 20, 2009, now U.S. Pat. No. 8,323,816.
Agruss, "The Thermally Regenerative Liquid-Metal Cell," Journal of the Electrochemical Society, vol. 110, No. 11, pp. 1097-1103, Nov. 1963.
Atthey, "A Mathematical Model for Fluid Flow in a Weld Pool at High Currents," J. Fluid Mech.,vol. 98, Part 4, pp. 787-801, 1980.
Cairns et al., "Galvanic Cells with Fused-Salt Electrolytes," AEC Research and Development, Argonne National Laboratory, Chemical Engineering Division, 44 pages, Nov. 1967.
Cairns et al., "High-Temperature Batteries—Research in high-temperature electrochemistry reveals compact, powerful energy-storage cells," Science, vol. 164, No. 3886, pp. 1347-1355, Jun. 20, 1969.
Cubicciotti et al., "Metal—Salt Interactions at High Temperatures: The Solubilities of Some Alkaline Earth Metals in their Halides," Journal of the American Chemical Society, vol. 71, No. 6, pp. 2149-2153, 1949.
Dworkin et al., "The Electrical Conductivity of Solutions of Metals in Their Molten Halides," The Journal of Physical Chemistry, vol. 70, No. 7, pp. 2384-2388, Jul. 1966.
Gay et al., "Lithium/Chalcogen Secondary Cells for Components in Electric Vehicular-Propulsion Generating Systems," Argonne National Laboratory, Argonne, Illinois, ANL-7863, 62 pages, Jan. 1972.
Jarrett et al., "Advances in the Smelting of Aluminum," Aluminum Company of America, Metallurgical Treatises, Warrendale, Pennsylvania: The Metallurgical Society of AIME, pp. 137-157, 1981.
Pongsaksawad et al., "Phase-Field Modeling of Transport-Limited Electrolysis in Solid and Liquid States," Journal of the Electrochemical Society, vol. 154, No. 6, pp. F122-F133, 2007.
Shimotake et al., "Bimetallic Galvanic Cells With Fused-Salt Electrolytes," Argonne National Laboratory, Argonne, Illinois, pp. 951-962, 1967.
Shimotake et al., "Secondary Cells with Lithium Anodes and Immobilized Fused-Salt Electrolytes," I&EC Process Design and Development, vol. 8, No. 1, pp. 51-56, Jan. 1969.
Weaver et al., "The SodiumiTin Liquid-Metal Cell," Journal of the Electrochemical Society, vol. 109, No. 8, pp. 653-657, Aug. 1962.
International Searching Authority, International Search Report—International Application No. PCT/US2007/018168, dated Sep. 18, 2008, together with the Written Opinion of the International Searching Authority, 13 pages.
European Patent Office, Extended European Search Report—Application No. 13196841.4-1360, dated Feb. 12, 2014, 7 pages.
International Searching Authority, International Search Report—International Application No. PCT/US2010/002035, dated Feb. 7, 2011, together with the Written Opinion of the International Searching Authority, 16 pages.
International Searching Authority, International Search Report—International Application No. PCT/US2011/052316, dated Dec. 29, 2011, together with the Written Opinion of the International Searching Authority, 12 pages.

* cited by examiner

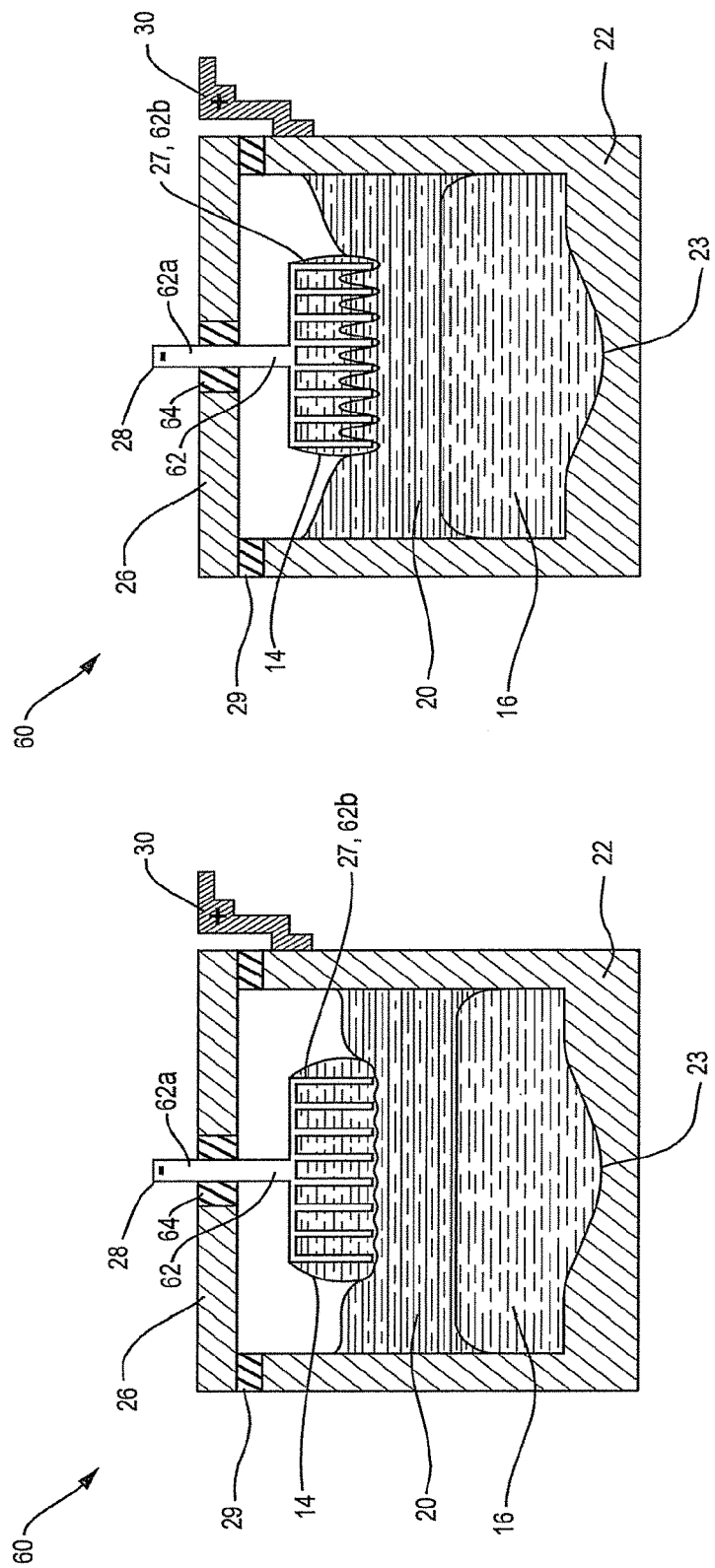

LIQUID METAL ALLOY ENERGY STORAGE DEVICE

CROSS-REFERENCE TO RELATED APPLICATIONS

The present application is a continuation of U.S. patent application Ser. No. 12/839,130, filed Jul. 19, 2010, now U.S. Pat. No. 9,076,996, which is a continuation-in-part of U.S. patent application Ser. No. 12/505,937, filed Jul. 20, 2009, the disclosures of which are incorporated by reference herein in their entirety.

TECHNICAL FIELD

This invention relates to electrical energy storage. It relates especially to electrochemical energy storage cell devices or batteries having liquid components and enhanced current-carrying capabilities.

BACKGROUND

Balancing supply and demand of electrical energy over time and location is a longstanding problem in an array of applications from commercial generator to consumer. The supply-demand mismatch causes systemic strain that reduces the dependability of the supply, inconveniencing consumers and causing loss of revenue. Since most electrical energy generation in the United States relies on the combustion of fossil fuels, suboptimal management of electrical energy also contributes to excessive emissions of pollutants and greenhouse gases. Renewable energy sources like wind and solar power may also be out of sync with demand since they are active only intermittently. This mismatch limits the scale of their deployment. Large-scale energy storage may be used to support commercial electrical energy management by mitigating supply-demand mismatch for both conventional and renewable power sources.

One approach to energy storage is based on electrochemistry. Conventional lead-acid batteries, the cheapest commercial battery technology on the market, have long been used for large-scale electrochemical energy storage. Facilities housing vast arrays of lead-acid cells have been used to provide high-capacity electricity storage, on the order of 10 MW. However these facilities are neither compact nor flexibly located. The short cycle life of lead-acid batteries, on the order of several hundred charge-discharge cycles, limits their performance in uses involving frequent activation over a wide voltage range, such as daily power management. The batteries do not respond well to fast or deep charging or discharging, which lowers their efficiency and reduces their lifespan.

Sodium-sulfur ("NAS") batteries have been adapted to large-scale power management facilities in the US and Japan. An NAS battery incorporates molten sodium and sulfur electrodes opposed across a solid ceramic electrolyte. The electrolyte must be very thin in order to maximize sodium ion conduction, but this makes it mechanically fragile and imposes severe limits on the maximum size of an individual cell. This, in turn, affects scalability, i.e., large capacity must be achieved through many small cells rather than through few large cells, which greatly increases complexity and ultimately increases the cost of the system. Cell construction is complication by sodium's violent reaction with water and rapid oxidation in air.

There is, accordingly, a need for an energy storage device combining capacity, economy, flexibility and long life.

SUMMARY OF THE INVENTION

In one embodiment, an electrochemical battery comprises a container, a positive electrode, a negative electrode and an electrolyte, disposed between the positive electrode and the negative electrode, all existing as respective liquid material layers in a vertical stack in the container at the operating temperature of the battery so that adjacent layers form respective electrode/electrolyte interfaces. The battery also comprises a circulation producer configured to generate circulation within one of the layers, thereby inducing a flow of liquid material of the one of the layers to and from one of the electrode/electrolyte interfaces.

In another embodiment, an electrochemical battery configured for exchanging energy with an external device comprises an open top container having walls and containing a positive electrode, a negative electrode and an intervening electrolyte. The electrodes and the electrolyte exist as liquid material layers within the walls of the container at the operating temperature of the battery, with one of the positive electrode and the negative electrode being disposed over the electrolyte. A lid closes the top of the container. A positive current collector is in electrical contact with the positive electrode. A negative current collector is in electrical contact with the negative electrode. The positive current collector and the negative current collector are adapted for connection to the external device to create a circuit through which current flows, and the current collector in contact with the electrode disposed over the electrolyte is suspended from the lid and comprises a composite electrically conductive structure. The structure includes a first member that holds the electrode disposed over the electrolyte spaced away from the walls and is of a first substance that is not wet by the liquid material of said one electrode; and a second, electrically conductive member within the first member that is of a second substance that is wet by the liquid material of said one electrode.

In another embodiment a method of exchanging energy with an external device comprises providing an external energy exchanging device and a battery. The battery includes a container containing a positive electrode, a negative electrode and an intervening electrolyte, the positive and negative electrodes and the electrolyte existing as liquid material layers in a vertical stack in the container so that adjacent layers form respective electrode/electrolyte interfaces; a positive current collector in electrical contact with the positive electrode; a negative current collector in electrical contact with the negative electrode; and electrical connections connecting the external energy exchanging device to the positive and negative current collectors, thereby creating a circuit through which current flows. The method uses normal operational energy in the battery to generate circulation within at least one of the layers so as to increase the flux of material of the at least one of the layers to and from one of the electrode/electrolyte interfaces.

In yet another embodiment, an electrochemical battery is configured to exchange energy with an external device. The battery comprises an electronically conductive molten positive electrode comprising an alkaline earth metal and an additional element; an electronically conductive liquid negative electrode comprising the alkaline earth metal; and a liquid electrolyte comprising cations of the alkaline earth metal, disposed between the positive electrode and the negative electrode to form respective electrolyte-electrode interfaces therewith. The positive electrode, the negative electrode and the liquid electrolyte exist as respective liquid layers of respective liquid materials in a vertical stack, and the alkaline earth metal is present in respective disparate chemical potentials in the positive electrode and the negative electrode, thereby originating a voltage therebetween.

BRIEF DESCRIPTION OF THE DRAWINGS

The invention description below refers to the accompanying drawings, wherein identical reference numerals designate analogous functional elements, and in which:

The invention description below refers to the accompanying drawings, wherein identical reference numerals designate analogous functional elements, and in which:

FIGS. 5A-5B are vertical sections illustrating the charging process of a battery, having a liquid metal negative electrode held by a suspended structure, constructed in accordance with the invention;

Figure 1:
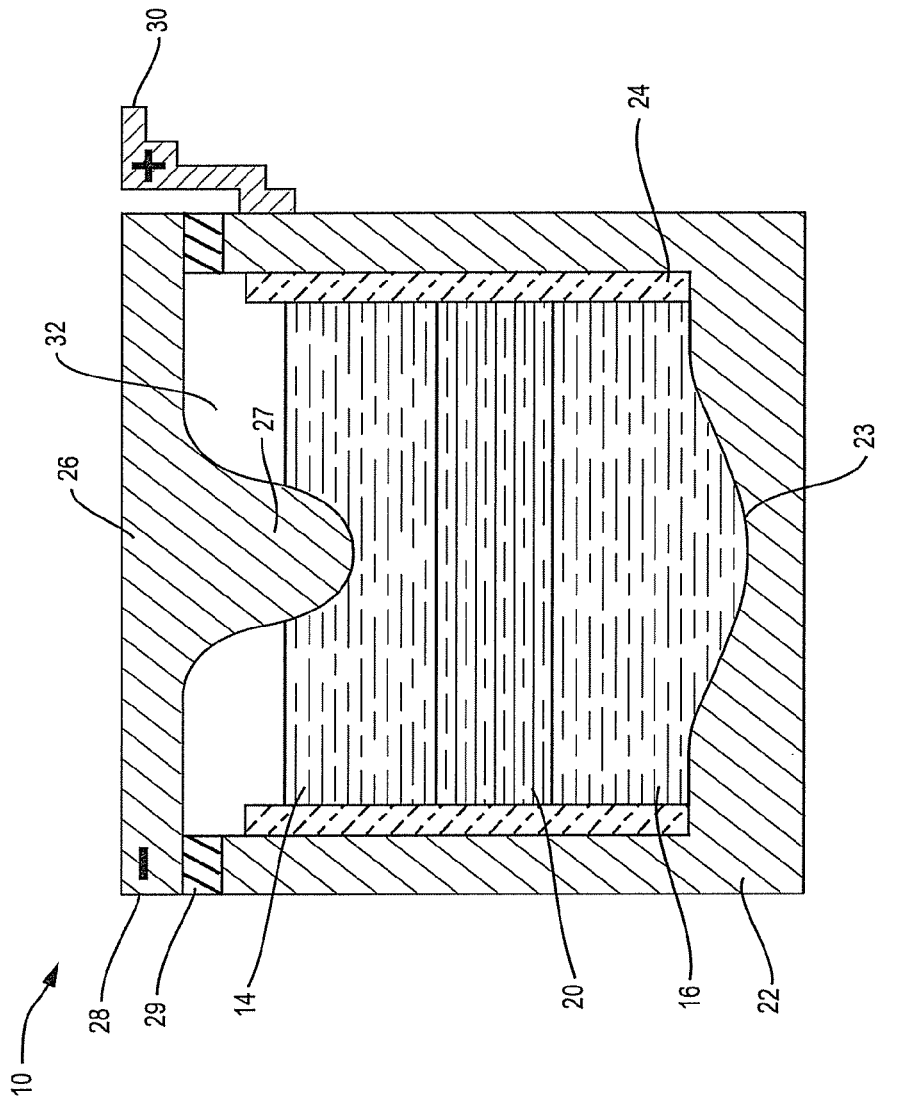
FIG. 1 is a vertical section showing a self-segregating alkaline earth metal-ion energy storage battery constructed in accordance with the invention.

Features in the drawings are not necessarily to scale.

DESCRIPTION OF THE PREFERRED EMBODIMENTS

It will be understood that as used herein, "battery" may encompass individual electrochemical cells or cell units, comprising a positive electrode, a negative electrode and an electrolyte, and configurations comprising a plurality of electrochemical cells. With reference to FIG. 1, an alkaline earth metal ion energy storage cell, or battery, indicated generally at 10, incorporates three distinct liquid constituents: a molten metal body 14 that serves as negative electrode, also referred to as the active metal electrode; an electronically conductive multi-elemental liquid body 16 that serves as positive electrode, also referred to as the alloy electrode; and an intervening ionically conductive electrolyte 20.

The electrically conductive liquid layers 14, 16 and 20 are confined in an electronically conductive container 22 which illustratively provides mechanical support to an insulating inner sheath 24. The sheath 24 prevents shorting by electronic conduction between the negative electrode 14 and the positive electrode 16 through the container 22.

The container 22 is covered by a lid 26 which is illustratively electronically conductive. An electrically insulating seal 29 electrically isolates the lid 26 from the container 22 and confines molten constituents and vapors within the container 22. A portion of the lid 26 in contact with the negative electrode 14 functions as a negative current collector 27, through which electrons may pass to an external source or sink (not shown) by way of a negative terminal 28 in contact with the lid 26. A portion of the container 22 in contact with the positive electrode 16 functions as the positive current collector 23 of the battery 10, through which electrons may pass to the external source or sink by way of a positive terminal 30 connected to the container 22. The placement of the negative terminal 28 and the positive terminal 30 may facilitate arranging individual cell units in series by connecting the negative terminal 28 of one cell unit to the positive terminal 30 of another cell unit 10 to form a larger battery.

An inert gas layer 32 overlaying the negative electrode 14 may accommodate global volume changes in the three-phase system of the battery 10 during charging and discharging thereof or due to temperature changes. Optionally, the lid 26 or seal 29 incorporates a safety pressure valve (not shown).

The container 22 and the lid 26 are each of a material having the requisite electronic conductivity, mechanical strength, and resistance to chemical attack by the liquid electrodes 14 and 16 and electrolyte 20. The sheath 24 is of an electronically insulating material and may be corrosion-resistant against the two liquid electrodes 14 and 16 and the molten electrolyte 20. Boron nitride, aluminum nitride, alumina, and magnesia are candidate sheath materials. The seal 29 may be formed of one or more materials such as magnesia cement, aluminoborate glasses, and other high temperature sealants as known to those skilled in the art.

The electrodes 14 and 16 and electrolyte 20 are constituted to establish chemical and physical properties compatible with simplicity and economy of construction, robustness, and rapid and efficient receipt and delivery of electrical energy. The use of electronically conductive liquids for electrodes 14 and 16 with a liquid electrolyte 20 facilitates facile oxidation and reduction of the active alkaline earth metal and its cation at the electrodes 14 and 16. The electronic conductivity of the liquid electrodes promotes high current density during operation of the cell 10 by enabling electron-transfer reactions to occur at sites over entire liquid electrode-electrolyte interfaces rather than being limited to triple-phase intersections. Furthermore, because reactions at both electrodes occur entirely in the liquid state, the reaction kinetics are not throttled by the nucleation of distinct product phases. Thus, the constituents of the cell 10 are consistent with extremely high current densities on the order of 1 A/cm$^2$, a magnitude observed in the high-temperature electrometallurgical industry, e.g., in the electrolytic production of aluminum.

The chemical compositions of the molten electrodes 14 and 16 are formulated conjunctionally to incorporate an active alkaline earth metal, such as beryllium, magnesium, calcium, strontium or barium at respective disparate thermodynamic activities, thereby generating voltage between the electrodes 14 and 16. In order to create thermodynamic activity disparity of the active alkaline earth metal between the negative 14 and positive 16 electrodes, at least one of the electrodes 14 and 16 includes one or more additional elements, other than the alkaline earth metal. Any additional element may be, e.g., miscible in the liquid composition of the electrode 14 or 16 so as to form a liquid alloy with the alkaline earth metal, or exist in a compound with the alkaline earth metal under the operating conditions. The one or more additional elements are chosen to constitute the positive electrode 16 as an environment of relatively low thermodynamic activity of the active alkaline earth metal, compared to the negative electrode 14, when the cell 10 is in a charged state. As used herein with reference to the positive alloy 16, "alloy electrode" does not encompass only liquid-phase solutions conventionally referred to as alloys but also liquid-phase compounds of the active alkaline earth metal and one or more additional elements.

In choosing additional elements, in addition to the active alkaline earth metal, for the electrodes 14 and 16, not only chemical equilibria and solution thermodynamics in the electrodes 14 and 16 but also their interactions with the electrolyte 20 must be considered, as well as their relative densities and liquid ranges. Any element in the electrodes 14 or 16 in addition to the active alkaline earth metal ideally should not interact with the ions in the electrolyte in a way that would provide a competing pathway for charge transport and circumvent the prescribed electrode reactions.

Thus, elements that may be appropriate for incorporation in the alloy electrode 16 to reduce the activity of the active metal may include aluminum, tin, lead, germanium, indium, pnicogens such as bismuth and antimony, and chalcogens such as tellurium and selenium. The electrodes 14 and 16 may include other species, for example, to tailor physical properties or enable electrochemical monitoring of the extent of discharge, as is known to those skilled in the art. For example, one or more additional transition metals or metalloids, such as copper, silicon, iron, or gallium, may be added in smaller quantities adjust the density and/or melting point.

The use of an alkaline earth metal, such as beryllium, magnesium, calcium, strontium or barium, in the electrodes 14 and 16 of the all-liquid alkaline earth metal ion energy storage batteries 10 may have several advantages over conventional battery materials. For example, the voltage generated by the illustrative calcium-metalloid couple in a single cell may be on the order of 0.5 V, 0.75 V or greater, exceeding the corresponding voltage of an analogous lithium- or sodium-based system and correlating with a larger energy capacity on a molar basis. Also, calcium and magnesium, for example, are relatively inexpensive compared to lead or alkali metals and are easier to manage than alkali metals in that they may be safely handled in open air, do not react violently with water, and can be held with bare hands. Whereas an alkali metal cation carries a single positive charge, an alkaline earth metal cation carries a +2 charge and consequently makes available in theory a doubled charge capacity of the alkaline earth metal ion energy storage cell 10 compared to alkali metal cells.

The electrolyte 20 of the battery 10 may be a molten salt, dissolving a cation of the active alkaline earth metal, also referred to herein as the active cation, and one or more supporting compounds. The electrical conductivity of the electrolyte 20 may be greater than 0.01 siemens/cm, 0.05 siemens/cm or a greater value.

Illustratively the molten salt is a chloride, such as a chloride of the active alkaline earth metal. Alternatively, the salt of the active alkaline earth metal may be, e.g., a non-chloride halide, a bistriflimide, fluorosulfano-amine, perchlorate, hexaflourophosphate, tetrafluoroborate, carbonate or hydroxide. A supporting compound is typically added to enhance ionic conductivity, and/or to inhibit electronic conductivity through the electrolyte. The supporting electrolyte may comprise any of the aforementioned anions and a cation such as an alkali or alkaline-earth metal, an imide, amine, ammonium, phosphonium or pyrrolidinium.

Other additives to the electrolyte 20 may reduce the viscosity, depress the melting point, alter the density, or reduce vapor pressure. The supporting electrolyte and any other additives illustratively have free energies of formation more negative than that of the reaction compound so that the cationic constituents of the supporting electrolyte and any additive electrodeposit at more extreme values of potential, or at higher values of cell voltage, than that associated with moving the active alkaline earth metal from the active metal electrode 14 to the alloy electrode 16, in order to limit the electrode reactions to the oxidation and reduction of the active alkaline earth metal. These and other considerations informing the choice of electrolyte composition are known to those skilled in the art.

If the active alkaline earth metal is calcium, the electrolyte 20 may further include complexing ligands to reduce the solubility of elemental calcium in molten calcium chloride. Ligands delivered by large monovalent cations having a relatively low charge density may complex divalent cations such $Ca^{2+}$. For example, chloride anions introduced by addition of potassium chloride, sodium chloride, or other appropriate alkali metal-halide salts may lower the solubility of calcium metal in a calcium-halide mixture. Electrolyte compositions in the system KCl—KI—KBr—$CaCl_2$, at 5 mol % to 50 mol % $CaCl_2$, may provide the desired combination of ionic conductivity, melting temperature and complexing action.

The compositions of the electrode 14 and 16 and electrolyte 20 may be formulated so that all-liquid operation occurs at moderately elevated temperatures, illustratively between 300° C. or 400° C. and 750° C. Operation at temperatures greater than about, e.g., 300° C. or 400° C., facilitates electrode reaction kinetics and ion migration in the electrolyte 20. However, difficulties such as volatilization of cell constituents, structural weakness, chemical attack of ancillary materials, and power required to maintain liquidity of the electrodes 14 and 16 and electrolyte 20 become more likely as operating temperature increases. Operation below 750° C. may afford the kinetic advantages of high temperatures without the associated drawbacks.

The electrodes 14 and 16 and the electrolyte 20 may be furthermore formulated so that their densities are ordered in accordance with their functions in the battery 10. Embodiments having respective densities increasing, as shown in FIG. 1, or decreasing in the order negative electrode 14/electrolyte 20/positive electrode 16 may spontaneously self-segregate into the illustrated vertically stacked layered structure upon melting, providing for simple manufacture from billets.

Energy storage in the alkaline earth metal ion battery 10 is not limited to any particular method of attaining or maintaining the operating temperature thereof. The constituents forming any of the layers 14, 16, and 20 may be melted in a separate heated chamber with sufficient superheat to allow transfer to the container 22. In another approach, external heaters (not shown) placed, for example, within the wall of the container 22 may be used before or during operation. Alternatively, the battery 10 may be self-heating during operation through applied overpotentials. Techniques for achieving and managing temperature profiles in molten constituents, and other practical aspects of electrometallurgical systems potentially helpful to implementing power storage using liquid alkaline earth metal electrodes, such as construction of apparatus for use with molten salts and liquid metals, are known to those skilled in the art and have been described, for example, in commonly owned pending U.S. application Ser. No. 11/839,413, filed Aug. 15, 2007 and Ser. No. 12/505,937, filed Jul. 20, 2009 and in U.S. Pat. Nos. 4,999,097 and 5,185,068, the entire disclosures of all of which are incorporated herein by reference.

The illustrative alkaline earth metal ion battery 10 receives or delivers energy by transporting an alkaline earth metal, referred to herein as the active alkaline earth metal, between the two molten electronically conductive electrodes 14 and 16 via an electrochemical pathway. The liquid electrolyte 20 comprising a cation of the active alkaline earth metal enables ionic transport of the active alkaline earth metal during charging or discharging.

Figure 2:
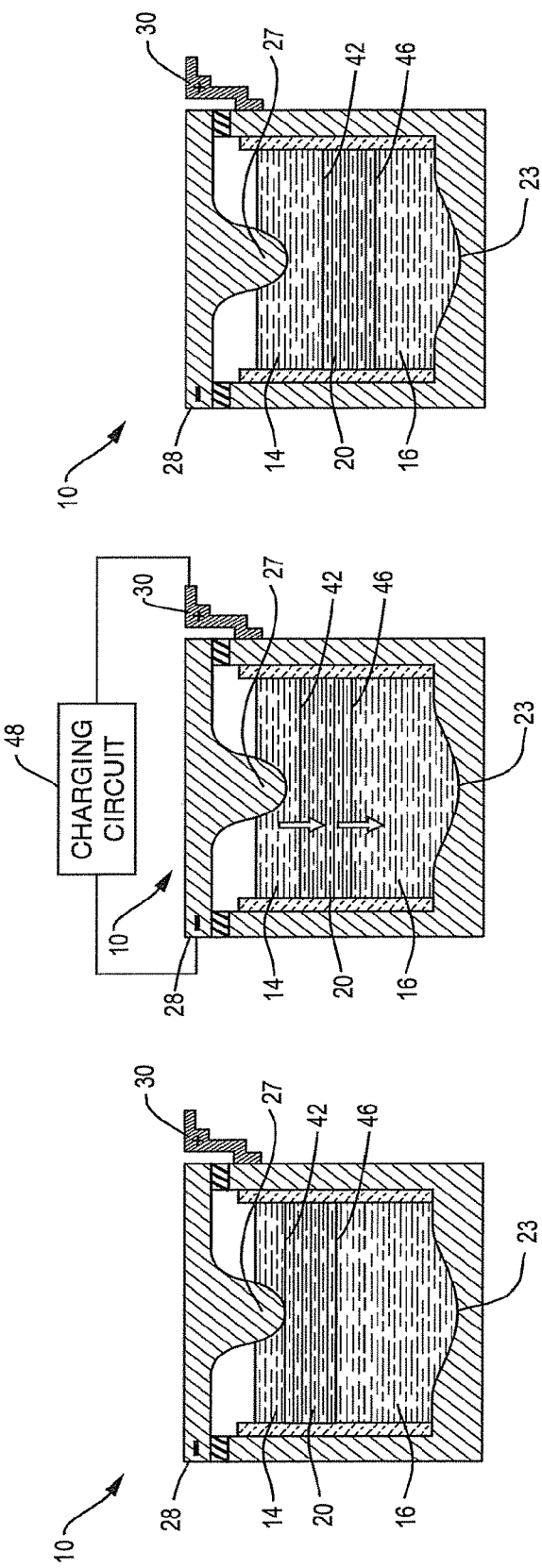
FIGS. 2A-2C are vertical sections illustrating the charging process of a self-segregating alkaline earth metal-ion energy storage battery unit constructed in accordance with the invention.

FIGS. 2A-2C illustrate the function of the cell 10 during charging. FIG. 2A shows the cell 10 in an uncharged or discharged state. Before charging, the positive electrode 16 contains atoms of the active alkaline earth metal. The negative electrode 14 meets the electrolyte 20 at an active metal-electrolyte interface 42. The positive electrode 16 meets the electrolyte 20 at an alloy-electrolyte interface 46.

With reference to FIG. 2B, to initiate charging, the terminals 28 and 30 are connected to an external charging circuit 48 driving transport of the active alkaline earth metal from the positive electrode 16, through the electrolyte 20 to neutral metal at a higher chemical potential in the negative electrode 14. During charging, electron current travels from the external circuit through the negative current collector 27 into the negative electrode 14 and to the active metal-electrolyte interface 42. Active cations $M^{2+}$ move across the electrolyte 20 toward the active metal-electrolyte interface 42. The active cations and the electrons meet at the interface 42 and are consumed in the reduction half-cell reaction $M^{2+}+2e^-\rightarrow M$. The neutral active alkaline earth metal atoms M created in the half-cell reaction accrue to the negative electrode 14. As the active alkaline earth metal M accumulates in the negative electrode 14, the active metal-electrolyte interface 42 moves further away from the negative current collector 27. At the alloy-electrolyte interface 46 atoms of the active alkaline earth metal M in the positive electrode are oxidized in the half-cell reaction $M\rightarrow M^{2+}+2e^-$. As active cations $M^{2+}$ enter the electrolyte 20, electrons are freed to pass through the positive current collector 23 to the external charging circuit 48. Oxidation of the active alkaline earth metal atoms M shrinks the positive electrode 16, and the alloy-electrolyte interface 46 moves toward the positive current collector 23.

FIG. 2C shows the battery 10 in its final charged state. Charging has changed the composition of at least the positive electrode 16 by loss of atoms of the active alkaline earth metal. The alloy electrode 16 may in principle be nominally free of the active alkaline earth metal, and therefore not actually be an alloy, mixture or compound at this point in the charge-discharge cycle. The thickness of the negative electrode 14 has grown at the expense of the positive electrode 16. Since the charging process is conservative with respect to the active cations, the thickness of the electrolyte 20 is ideally unchanged.

The active alkaline earth metal deposited in the molten active metal electrode 14 represents stored electrical energy which may persist indefinitely, as long as no external electronic path joins the two electrodes 14 and 16. The half-cell reactions in the cell 10 generate liquid-phase products that remain at the electrodes 14 and 16, in contact with the electrolyte. While the electrodes 14 and 16 and electrolyte 20 are at a liquid range temperature, the active alkaline earth metal and the active cation remain available to mechanize discharge via an electrochemical pathway. This reversibility suits the active alkaline earth metal ion batteries for energy storage.

Figure 3:
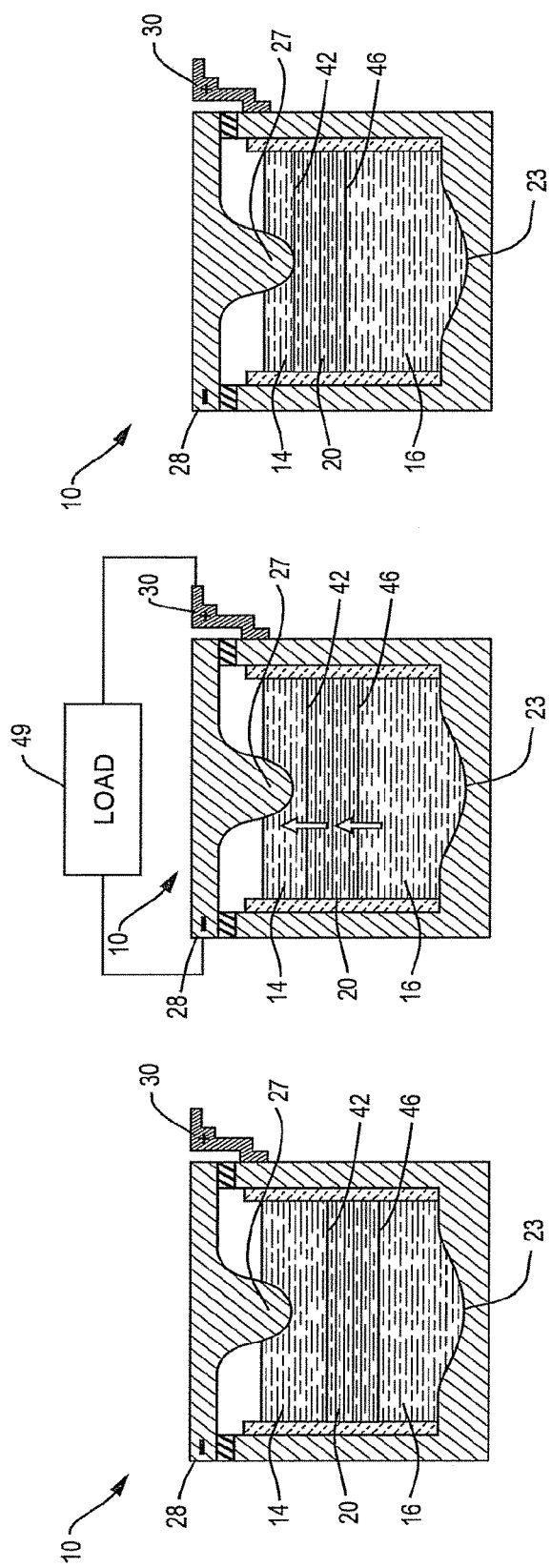
FIGS. 3A-3C are vertical sections illustrating the discharging process of a self-segregating alkaline earth metal-ion energy storage battery unit constructed in accordance with the invention.

FIGS. 3A-3C illustrate discharging the battery 10. FIG. 3A shows the cell 10 in a charged state. With reference to FIG. 3B, connecting the terminals 28 and 30 to an external load 49 initiates discharge. During discharge the active alkaline earth metal moves spontaneously from the negative electrode 14, through the electrolyte 20 as active cations, and reverts to neutral metal at a lower chemical potential in the positive electrode 16. Electron current travels into the cell through the positive current collector 23 and the positive electrode 16 to the alloy-electrolyte interface 46. Active cations $M^{2+}$ migrate across the electrolyte 20 toward the alloy-electrolyte interface 46. Active cations $M^{2+}$ and electrons are consumed at the interface 46 in the reduction half-cell reaction $M^{2+}+2e^-\rightarrow M$. The neutral active alkaline earth metal atoms M produced accrue to the positive electrode 16. As the active alkaline earth metal M accumulates in the positive electrode 16, the alloy-electrolyte interface 46 moves further away from the positive current collector 23. At the active metal-electrolyte interface 42, atoms of the active alkaline earth metal M in the negative electrode 14 are oxidized in the half-cell reaction $M\rightarrow M^{2+}+2e^-$. The active cations $M^{2+}$ produced enter the electrolyte 20, and the freed electrons pass through the negative current collector 27 to the external load 49. Oxidation of the active alkaline earth metal atoms causes attrition of the negative electrode 14, with movement of the active metal-electrolyte interface 42 toward the negative current collector 27.

FIG. 3C shows the cell 10 in its final discharged state. Charging has changed the composition of at least the positive electrode 16 due to accretion of active alkaline earth metal atoms. The thickness of the positive electrode 16 has grown at the expense of the negative electrode 14. Since the discharging process is conservative with respect to the active cations, ideally the thickness of the electrolyte 20 is unchanged. The substantially constant thickness of the electrolyte layer throughout the charge-discharge cycle enables the use of an electrolyte layer that is relatively thin compared to the electrode bodies. The thin electrolyte layer, combined with the inherently low resistivity of molten halides, minimizes the ohmic overpotential associated with the electrolyte. The energy capacity of the cell 10, which is no greater than the smaller of the quantities of active alkaline earth metal that can be accommodated by the negative electrode 14 and by the positive electrode 16, respectively, can be augmented by increasing the quantity of material in the electrodes 14 and 16 without, in principle, increasing the mass of the electrolyte 20 or its associated IR drop. For example, the thickness of the electrolyte 20 may be on the order of only 10%, 20% or 50% of the thickness of either of the electrodes 14 and 16.

In an illustrative embodiment, referred to herein as a calcium-bismuth battery, the active alkaline earth metal of the battery 10 is calcium ($\rho_{liquid} \approx 1.4$ g/ml), and an additional element diluting calcium activity in the alloy electrode 16 is bismuth ($\rho=9.8$ g/ml, $T_m=271°$ C.). The electrolyte 20 is based on, e.g., the KCl—CaCl$_2$ eutectic ($T_m=600°$ C.) at 25 mol % CaCl$_2$ with 10 mol % KI added to increase density. The liquid densities of KCl, CaCl$_2$, and KI are 1.5 g/ml, 2.07 g/ml, and 2.33 g/ml, respectively. The operating temperature of the cell 10 is illustratively about 700° C. The container 22 and lid 26 are illustratively of mild steel.

In addition to calcium, the illustrative active metal electrode 14 may comprise magnesium, so that the liquid range of the electrode 14 in the embodiment is in the moderately elevated temperature range, lower than the melting point of calcium (850° C.). Diluting the calcium in the active metal electrode 14 necessarily reduces the activity of calcium in the electrode 14, thereby reducing the voltage deliverable by the battery 10. A relatively marked reduction in voltage is to be expected when the resulting system, like the calcium-magnesium binary system, forms compounds in the solid state, indicative of a negative deviation from ideality. It has been discovered that it is possible to include another metal, for example another alkaline earth metal, in addition to the active alkaline earth metal, in the electrode 14 in sufficient quantity to bring the operating temperature into the desired moderately elevated range without unacceptable compromise of the cell voltage. For example, adding magnesium to a concentration of 80 atomic percent may give the active metal electrode 14 a melting temperature less than 700° C. while only diminishing the voltage of the calcium ion cell by about 0.1 V. The calcium concentration in the active metal electrode 14 of a cell having Ca$^{2+}$ as the active ion may be less on an atomic basis than about 80%, 50%, 30%, 20% or 10%, with the balance being, e.g., magnesium, lithium or sodium. The calcium concentration in the active metal electrode 14 may be greater on an atomic basis than about 20%, 40%, or 60%.

When the cell is fully charged (FIG. 3A), the molten active metal electrode 14 of the illustrative calcium-bismuth battery 10 is a body of about 20 atomic percent calcium in magnesium ($\rho_{liquid}=1.5$ g/ml, $T_m \approx 650°$ C.), and the alloy electrode 16 is a body of molten bismuth. After discharge (FIG. 3C), the active metal electrode 14 is relatively depleted of calcium. The calcium missing from the active metal electrode 14 has been transferred to the positive electrode 16, which has become a bismuth-calcium alloy. The open-circuit voltage of the calcium-bismuth cell fully charged may be on the order of 1 V.

Figure 4:
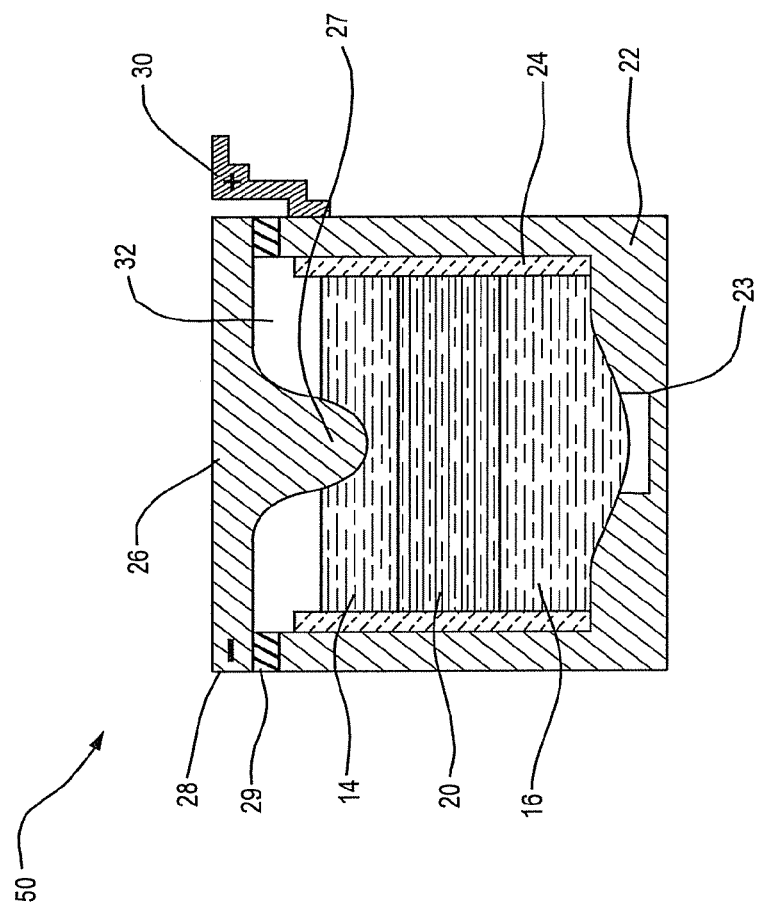
FIG. 4 is a vertical section showing another embodiment of the self-segregating alkaline earth metal-ion energy storage battery unit constructed in accordance with the invention.

In another illustrative embodiment, referred to herein as a magnesium-antimony battery, the active alkaline earth metal of a battery 50, shown in FIG. 4, is magnesium ($\rho=1.5$ g/ml, $T_m=650°$ C.), and the additional element diluting magnesium activity in the alloy electrode 16 is antimony ($\rho=6.5$ g/ml, $T_m=630°$ C.). The electrolyte 20 residing between the electrodes 14 and 16 comprises magnesium chloride. The magnesium-antimony cell illustratively operates around 700° C. The container 22 and lid 26 are illustratively fashioned out of graphite. The insulating sheath 24 may be made of boron nitride. A metal plug, illustratively of tungsten, compression fit in the bottom of the container 22 functions as the positive current collector 23. A molten salt such as magnesium chloride in the electrolyte 20 more readily wets the graphite bottom of the container 22 than does a molten metal such as the alloy electrode 16, thereby blocking electronic conduction between the positive electrode 16 and the container 22. The metal plug secures an electronically conductive pathway between the molten positive electrode 16 and the positive terminal 30.

When the battery 50 is fully charged each of the electrodes 14 and 16 is its respective nominally pure liquid element, as shown for the battery 10 in FIG. 3A. After discharge, the active metal electrode 14 in the battery 50 (FIG. 4) remains monoelemental, but smaller in mass than when the cell 50 is charged, as shown for the battery 10 in FIG. 3C. The magnesium missing from the active metal electrode 14 in the battery 50 (FIG. 4) has been transferred to the positive electrode 16, which has become an antimony-magnesium alloy. The alloying potential of magnesium in antimony at 700° C. is on the order of 0.5 V.

The actual open-circuit voltage of, e.g., the calcium-bismuth or magnesium-antimony cell, is influenced by the activities of the active alkaline earth metal in the electrodes, as expressed by the Nernst equation. The activities may exhibit large nonidealities which may shift the open-circuit voltage of the cell to values greater or less than its expected voltage. As mass of the active alkaline earth metal moves between the electrodes, changes in the respective chemical potentials change the open-circuit cell voltage, so it is not constant over the charge-discharge cycle.

In an alternative embodiment, the expense and complexity of electrically insulating the interior surface of the container 22 as shown for the batteries 10 (FIG. 1) and 50 (FIG. 4) are eliminated by providing a current collector, in contact with the electrode layer disposed above the electrolyte 20, that isolates that electrode layer from the container 22. With reference to FIG. 5A, in an alkaline earth metal ion energy storage battery 60 an electronically conductive structure 62, illustratively fixed in position, comprises a shaft 62a extending outside the lid 26 and constituting the negative terminal 28 of the battery 60 and a contact portion 62b, holding the liquid metal of the negative electrode 14 away from the interior sides of the container 22 and serving as the negative current collector 27. An insulating bushing 64, illustratively of boron nitride or alumina, separates the shaft 62a of the conductive structure 62 from the lid 26.

The structure 62 holds the active electrode 14 away from the container 22, obviating the insulting sheath 24. With reference to FIG. 5B, during discharging, as the volume of the alloy electrode 16 increases, the electrolyte 20 is pushed upward around the active alkaline earth metal electrode 14. The structure 62 is configured so that some of the molten electrode 14 remains between the negative current collector 27 and the electrolyte 20 when the cell is fully discharged and at all times.

Surface tension maintains the molten active-metal electrode 14 in place around the contact portion of the structure 62. The contact portion may be, e.g., mesh material folded into stacked layers or coiled into a spiral or tube. The mesh may be composed of strands on the order of 0.1 to 1 mm in diameter, with similar spacing. Alternatively, the permeable contact portion is a sponge.

Depending on the composition of the electrode 14, the structure 62 may be made of, e.g., carbon, mild steel, or a steel alloy—containing, for example, nickel and/or chromium—which is wet by the material of electrode 14. A wettable surface on the structure 62 promotes good electrical contact between the negative electrode 14 and its current collector 27. However, if material from the electrode 14 wetting the exterior of the contact portion 62b breaks off and floats on the surface of electrolyte 20 to the electrically conductive wall of container 22, the current-carrying efficiency of the battery 60 may be degraded by unwanted reactions between the material of the electrode 14 and the wall.

Figure 6A:
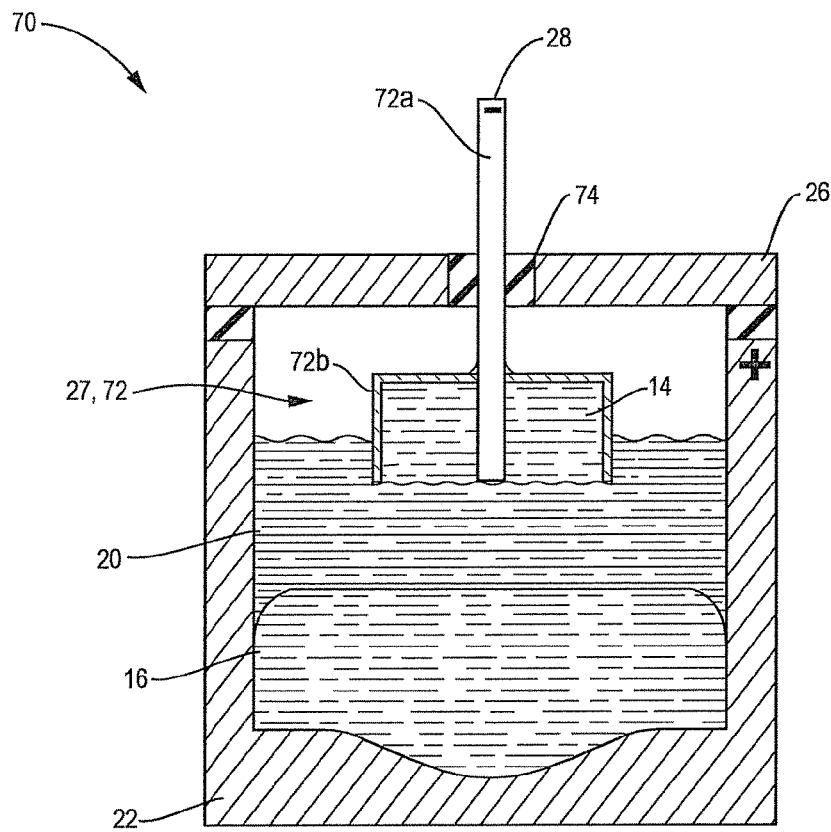
FIG. 6A is a vertical section illustrating a battery, having a liquid negative electrode held by a suspended structure, constructed in accordance with the invention

With reference to FIG. 6A, in another alternative embodiment, the negative electrode layer 14 in a battery 70 is held in place above the liquid electrolyte 20 and away from the interior sides of container 22 by an electrically conductive composite structure, shown generally at 72, suspended from the lid 26.

The composite structure 72 comprises a shaft 72a which extends up through an electrically insulating bushing 74 in the center of the lid 26, the upper end of that shaft constituting the battery's negative terminal 28. The bushing 74 may be of a suitable rigid, high temperature-resistant material such as boron nitride or alumina. The shaft 72a is of a highly electrically conductive material such as steel or stainless steel that the material of the electrode layer 14 does wet.

The lower end of the structure 72 includes an inverted cup 72b or comparable cage, surrounding the shaft 72a, that constitutes both the negative current collector 27 and a containment for the electrode layer 14. The cup 72b is of a material such as mild steel that the electrode layer 14 does not wet. Surface tension holds the electrode layer 14 liquid material to shaft 72a, but not to the cup. Thus, the structure 72 may provide better containment of the electrode layer 14 material, keeping it away from the wall of the container 22, while ensuring good electrical connection between the negative current collector 27 and its electrode layer 14.

Figure 6B:
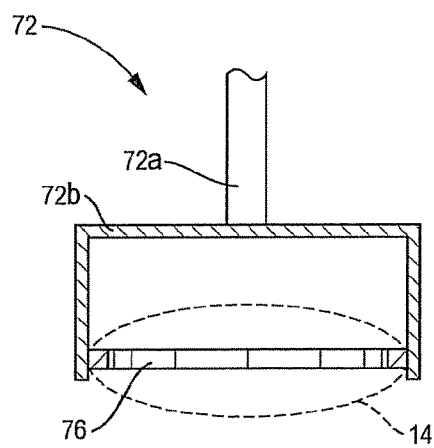
FIGS. 6B-6C are vertical sections, on a larger scale, of alternative negative current collectors suitable for the device shown in FIG. 6A.
Figure 6C:
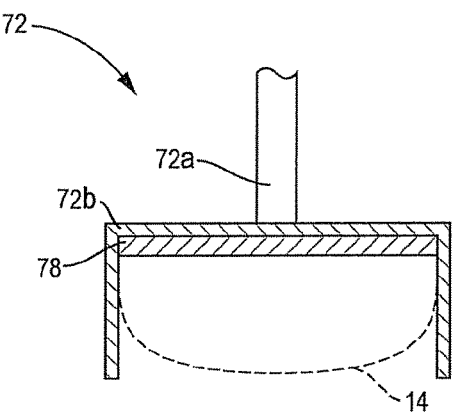

Other composite collector/containment structures for the top electrode similar to the structure 72 may be envisioned for the electrode layer 14. For example, the wettable shaft extension into the cup 72b of the structure 72 may be replaced by a ring 76 of the same material located just inside the rim of the non-wettable containment cup as shown in FIG. 6B or by a layer 78 of that same wettable material inside the top of the non-wettable cup 72b as shown in FIG. 6C.

Figure 7:
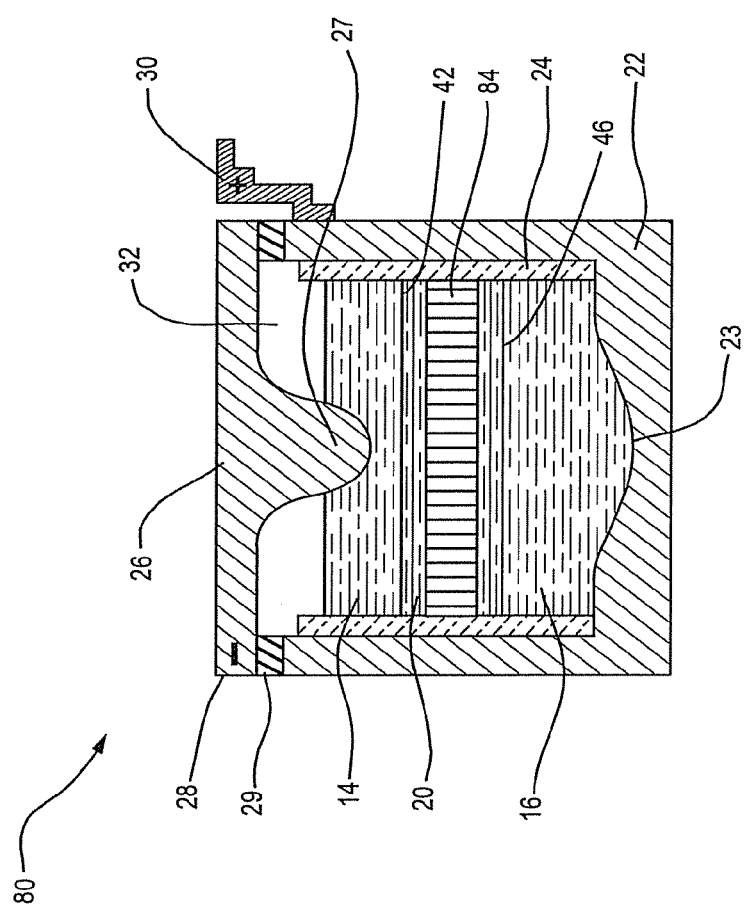
FIG. 7 is a vertical section illustrating a liquid-layer battery constructed in accordance with the invention, having a porous electrode separator.

In another alternative embodiment, the alkaline earth metal ion energy storage battery is configured for enhanced robustness by impeding mixing of the two electronically conductive liquids during shaking or tipping of the container 22. With reference to FIG. 7, in a reinforced battery 80, an electrode separator 84 infiltrated by electrolyte is interposed between the active electrode 14 and the alloy electrode 16 and held by friction to the sheath 24. The electrode separator 84 is illustratively of a material that is stable in contact with the molten electrolyte 20; wet by the molten electrolyte 20; and not wet by either of the electrodes 14 and 16. The separator 84 is permeated with holes or other porosity large enough to allow easy movement of ions between the electrodes 14 and 16, but the surface tension relationships between the separator 84 and the constituents 14, 16 and 20 of the cell 80 hinder contact between the negative 14 and positive 16 electrodes, thereby deterring shorting. The reinforced cell 80 may be constructed with a closer negative-positive electrode spacing, translating to less of the electrolyte 20 and thus greater voltage efficiency, compared to a cell lacking the separator 84.

When the active alkaline earth metal of the cell 80 is calcium, the separator 84 is illustratively of alumina. Other suitable materials for the electrode separator 84 may include ceramics such as magnesia, aluminum nitride, boron nitride, and silica glass. Illustratively, the pores in the separator are on the order of 1 to 5 mm in diameter. Depending on the surface tension values for the electrodes 14 and 16 and the electrolyte 20, the pores may be larger or smaller.

The fixed separator 84 may be most appropriate for operating conditions under which the positions of the interfaces 42 and 46 move little, for example a relatively short charge duration or charging at low current density. If the illustrative cell charges or discharges at high capacity, however, the interfaces 42 or 46 may move through the fixed separator 84. For operation under these conditions, the cell 80 may be constructed with a floating separator having a thickness less than or equal to the distance between the two interfaces 42 and 46.

Although conductive diffusion of molecules through liquids such as those constituting the electrodes and the electrolyte of the illustrative batteries is orders of magnitude faster than in solids, current through the all-liquid batteries may be mass-transfer limited due to relatively large diffusion distances in any of the layers 14, 16 and 20. For example, in a lithium-ion battery using micro- or nano-scale intercalant particles, a diffusivity in the order of $10^{-12}$ cm$^2$/s is adequate for complete penetration of the Li$^+$ ions at a rate that sustains charging and discharging of the battery. By contrast, in the illustrative batteries, diffusion distances may be millimeters or even many centimeters. Thus, mass transport limitations may hamper proper function of the illustrative batteries notwithstanding high diffusion coefficients in the liquid electrodes 14 and 16 and in the liquid electrolyte 20. For example, as a reactant in one of the electrode reactions is consumed, diffusion may not replace it at the respective electrode/electrolyte interface at a rate that can support the cell currents made possible by the facile electrode reaction kinetics.

Inadequate mass transport in the illustrative batteries may furthermore spoil charging and discharging operations of the illustrative batteries through other mechanisms. During charging of the illustrative alkaline earth metal ion battery as described above with reference to FIGS. 2A-2C, active alkaline earth metal is driven from the alloy electrode 16 across the alloy-electrolyte interface 46. Without adequate mass transport replenishing the region near the interface 46 from the interior of the alloy electrode 16, the portion of the electrode 16 reacting with the electrolyte 20 becomes metal-poor as charging progresses. As this depletion persists, the continuing operation of the charging circuit 48 may provoke other, undesirable electrode reactions at the interface 46.

Likewise, the desired electrode reactions, prescribed above, may be inhibited by the concentration of reaction products near an electrode/electrolyte interface. In the case of the illustrative alkaline earth metal ion battery, discharging relies on disparate activities of the alkaline earth metal at the respective electrode/electrolyte interfaces, described above with reference to FIGS. 3A-3C. During movement of the active alkaline earth metal from the negative electrode 14 to the alloy electrode 16, as the concentration of the active metal reaction product increases in the alloy electrode 16 at the alloy-electrolyte interface 46, the driving force of the electrochemical cell reaction moving the active alkaline earth metal into the alloy electrode 16 decreases. If the active alkaline earth metal in the alloy electrode 16 is located disproportionately near the interface 46, so that the concentration at the interface 46 does not reflect that electrode's global composition, the voltage delivered by the illustrative battery is compromised compared to what would be possible with a uniform electrode composition. For sufficient local concentrations of the active alkaline earth metal near the interface 46, discharging of the battery may cease altogether.

Accordingly, mass transport mechanisms other than conductive diffusion contributing to homogenization of the compositions of the liquid layers 14, 16 and 20 during charging and discharging may be valuable in achieving optimum operation of the illustrative batteries. By contrast, in a conventional high-temperature electrochemical metal extraction system, electroreduction augments the metal content of a substantially liquid metal body, in which concentration gradients are not operative. Thus, with intra-metal mass transport being relatively inconsequential, such processes may actually be configured to minimize movement within liquid layers in order to avoid shorting.

Alternative embodiments described hereinbelow are configured to enhance transport of active species to one or both electrode/electrolyte interfaces by generating convective flow within the liquid material layers in a battery such as, e.g., an alkaline earth metal ion battery. Transport-enhancing features function to induce flow within one or more of the liquid layers 14, 16 and 20, such as by generating one or more buoyancy- or gravity-driven or magnetically induced convection or circulation cells, which may cause mixing of the liquid material in one or more of the layers 14, 16 and 20 and convey material to and from respective electrode/electrolyte interfaces. While approaches to transport enhancement are described herein specifically in the context of high-temperature, liquid-electrode batteries, the enhancements described may also be useful in other electrochemical systems having liquid components, for example in selected electrowinning systems or lower-temperature devices such as, e.g., a fuel cell.

The flow induced in the liquid constituent(s) of the illustrative storage device does not have to be very fast to provide enhanced transport of species to and from the electrodes/electrolyte interface(s) and significantly enhance battery productivity. In fact, it can be shown that with a diffusivity of $10^{-5}$ cm$^2$/s in a liquid, a liquid flow rate of only ~0.1 mm/s provides more active species at the electrode/electrolyte interface than that caused by diffusion by itself in the liquid. Illustratively, the present storage device should produce a flow rate in the range of 0.1 to 1.0 mm/s.

In one approach to inducing flow in the illustrative batteries, the circulation producer produces or develops a thermal gradient in at least one of the liquid constituents 14, 16 and 20. The resulting nonuniformity in density may generate gravity or buoyancy-driven convective flow cells, sometimes referred to as Rayleigh-Bènard cells, in the liquid constituent. These initial free convection cells may, in turn, induce similar circulation in an adjacent constituent resulting in mixing of some, if not all, the liquid constituents of the battery. The circulation producer may include various different thermal flow management devices to initiate one or more free convection cells in at least one of the electrode or electrolyte layers of the battery to achieve the stated objectives. The battery may be configured to exploit the thermal energy present therein during normal operation, e.g., the heat that maintains the battery's constituents in a molten state or that is generated from joule heating of the battery by the charging/discharging thereof. In another embodiment, the battery may incorporate additional sources of heat.

A thermally insulating housing, enclosing the container 22, may form part of a circulation producer. The circulation producer furthermore includes one or more thermal management devices in a wall of the insulation. The thermal management device may be configured to provide a heat transfer path so that heat may be conducted away preferentially or asymmetrically from at least one of the liquid constituents 14, 16 and 20 of the battery. The resulting thermal gradient in the constituent creates free or gravity-driven convective flow within that constituent. Thus enhanced mass transport is achieved between the electrodes 14 and 16 without the cost and complexity of a pumping system effecting forced convective flow, such as is used in flow cells, for example.

Figure 8:
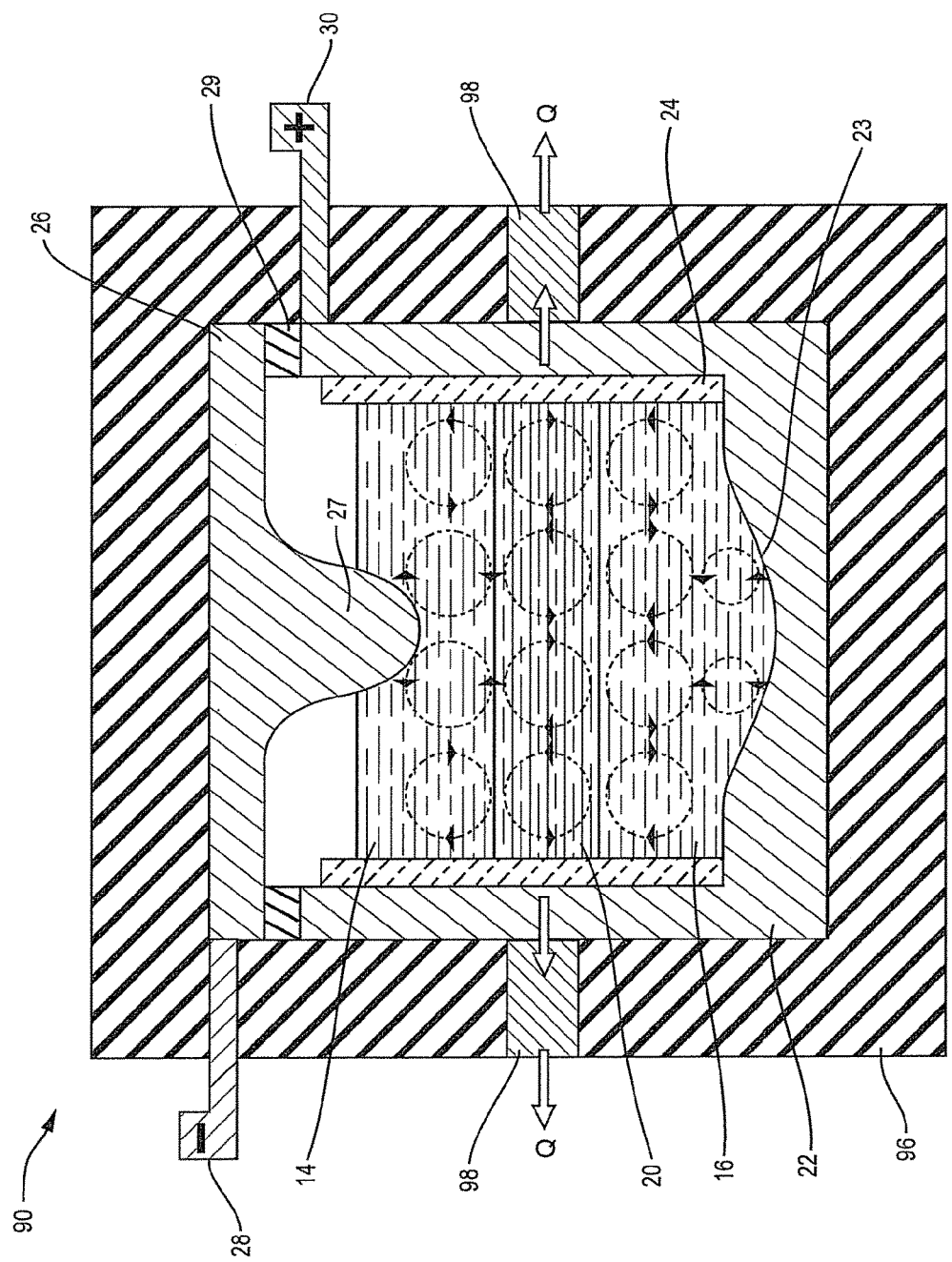
FIGS. 8-14 are vertical sections of battery embodiments, constructed in accordance with the invention, wherein one or more free convection cells are promoted in at least one of the liquid constituents thereof by a circulation producer comprising different thermal management devices.

Thus, with reference to FIG. 8, in an illustrative embodiment, a battery 90 incorporates thermal management devices 98 in the form of metal rods extending through a thermally insulating housing 96 to the opposite sides of the container 22 at the level of electrolyte layer 20 therein. The devices 98 are in intimate thermal contact with the conductive walls of container 22 so that, in effect, the container is less insulated at those locations. The devices 98 provide a heat transfer path between the container 22 and an outside space. Therefore, the liquid electrolyte 20 near the devices 98 is cooler, and therefore more dense, than at the center of the battery 90, causing liquid material in the electrolyte 20 to sink at those locations. Thus, the dissipation of heat (Q) via container 22 creates one or more convection cells in the electrolyte layer 20 as indicated by the circular arrows shown in phantom in FIG. 8. Illustratively, the connection of the positive terminal 30 to container 22 is located above the negative electrode 14 as shown to minimize heat dissipation via that electrode. In this case, the induced temperature gradient may be controlled solely by the thermal management devices 98.

Once the convection cells have been established in the layer 20, the interfacial boundary condition between it and the liquid layer 14 above, and the liquid layer 16 below, may cause movement in those layers, giving rise to similar circulation in layers 14 and 16 as indicated by the circular arrows in those layers. Thus, the flow induced in each layer in container 22 may introduce fresh reactive material to and convey products from the interfaces between those layers, thereby promoting the desired electrochemical reaction in the battery 90.

Figure 9:
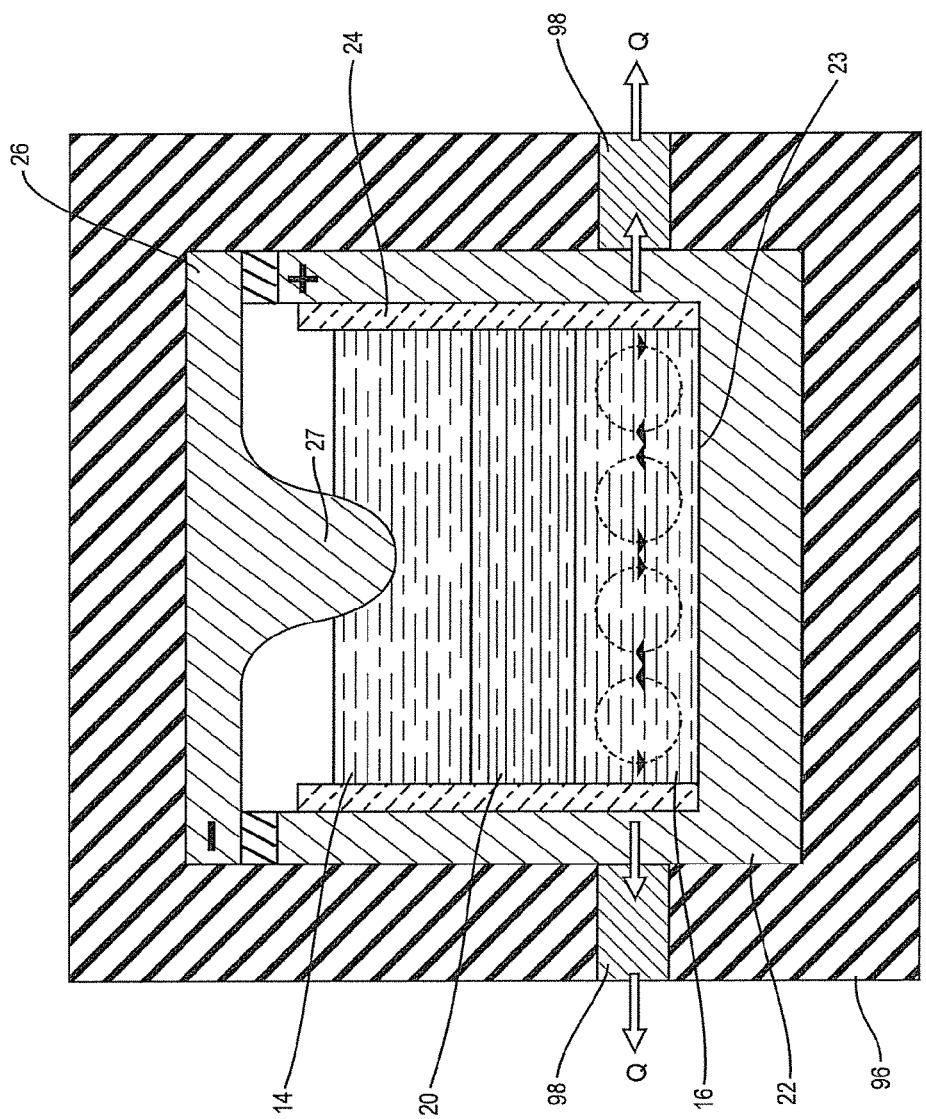

FIG. 9 shows another embodiment, similar to the battery 90 shown in FIG. 8 except that the thermal management devices 98 (e.g., metal rods) are present in the housing 96 at the level of the one of the electrode layers that is disposed under the electrolyte 20. Illustratively, in the alkaline earth metal ion battery, the positive electrode layer 16 is under the electrolyte 20 at the bottom of the container 22. Since the FIG. 9 battery includes the same components and operates in more or less the same way as the battery 10 in FIG. 8, the in-common components thereof bear the same identifying numerals. Also, for ease of illustration, the terminals 28 and 30 (FIG. 1) have been omitted from FIG. 9 and subsequent drawing figures.

In a manner similar to that occurring in battery 90 of FIG. 8, the heat removed from the sides of the positive electrode layer 16 via the side walls of container 22 and the devices 98 produces a thermal gradient therein which causes convection of the liquid material thereof as indicated by the circular arrows shown in phantom in FIG. 9. This may increase the flux within the electrode 16 of components to and away from the interface between the layers 16 and 20, thereby promoting desired electrochemical reaction thereat. Since the positive electrode layer 16, illustratively being of a metal or metalloid, is more dense than electrolyte layer 20, e.g., salt, this embodiment may require a larger thermal gradient to develop the initial convection cells in electrode layer 16 than is the case for the electrolyte layer 20 of the device in FIG. 8.

Although not shown in FIG. 9, the initial convection cells in the electrode layer 16 may induce flow or circulation in the adjacent electrolyte layer 20, and so on into the electrode layer 14 in a manner similar to that shown in FIG. 8.

Figure 10:
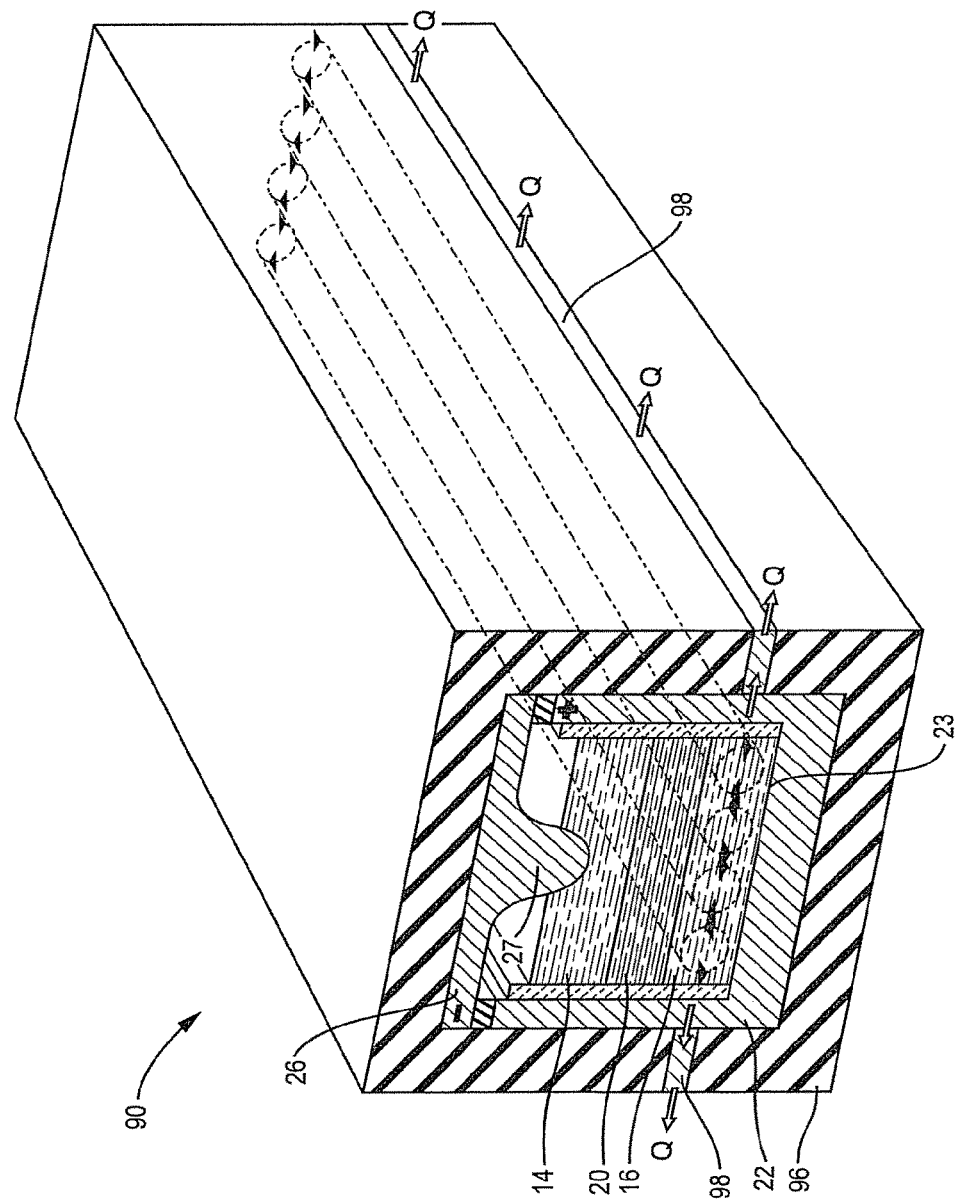

FIG. 10 illustrates a battery 90 which is essentially the same as the device in FIG. 9, except that it is longer or deeper. In this case, the thermal management devices 98 are spaced along the housing 96 and designed so that heat is dissipated via the side walls of container 22 all along the container to encourage the development of elongated cylindrical convection cells in electrode layer 16 as shown by the cylindrical arrows in FIG. 9.

Instead of providing individual heat dissipation devices 98 at each side of housing 96 as shown in FIGS. 8-10, devices 98 in the form of plates may be used, those plates being designed and dimensioned to produce the required temperature gradient in the operative liquid constituent to cause convective flow thereof.

Figure 11:
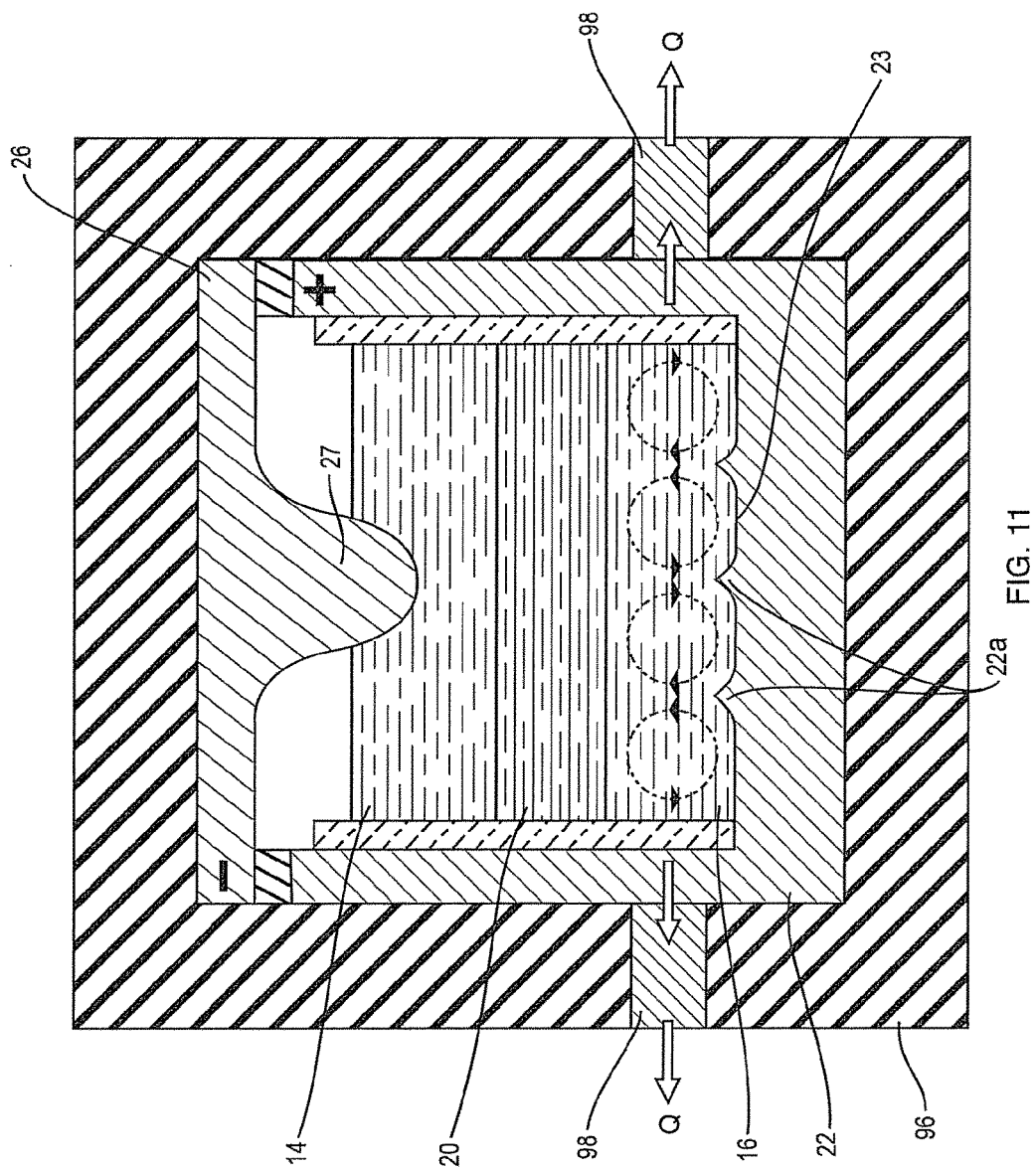

FIG. 11 illustrates a battery similar to the battery shown in FIG. 9 wherein the interior bottom wall of container 22 is formed with spaced-apart cusps 22a whose spacing promotes the formation of stable convection cells of a determined size in the electrode layer 16. As in the previous storage devices 90, these initial convection cells may promote similar circulation of the liquid material in the overlying liquid layer 20.

Figure 12:
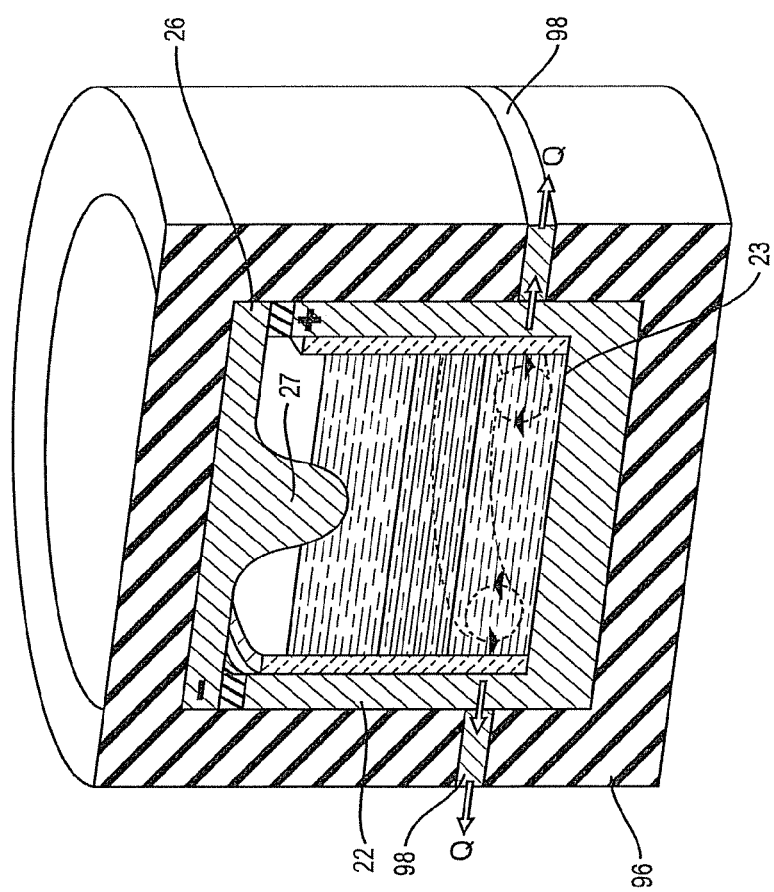

FIG. 12 shows a battery of cylindrical geometry having a thermally insulating housing 96 and a single thermal management device 98 therein in the form of a metal ring at the level of the positive electrode layer 16. In this embodiment, heat is dissipated radially from the interior of the device via the container 22 and device 98 all around the vertical axis of the battery 90 so that a convection cell in the form of a torus is formed in electrode layer 16. As in the earlier described embodiments, this convective flow in electrode layer 16 may induce similar circulation in the adjacent liquid layer 20 in container 22. Also, the ring could be located at the level of layer 14 or 20 to induce such convective flow therein.

Figure 13:
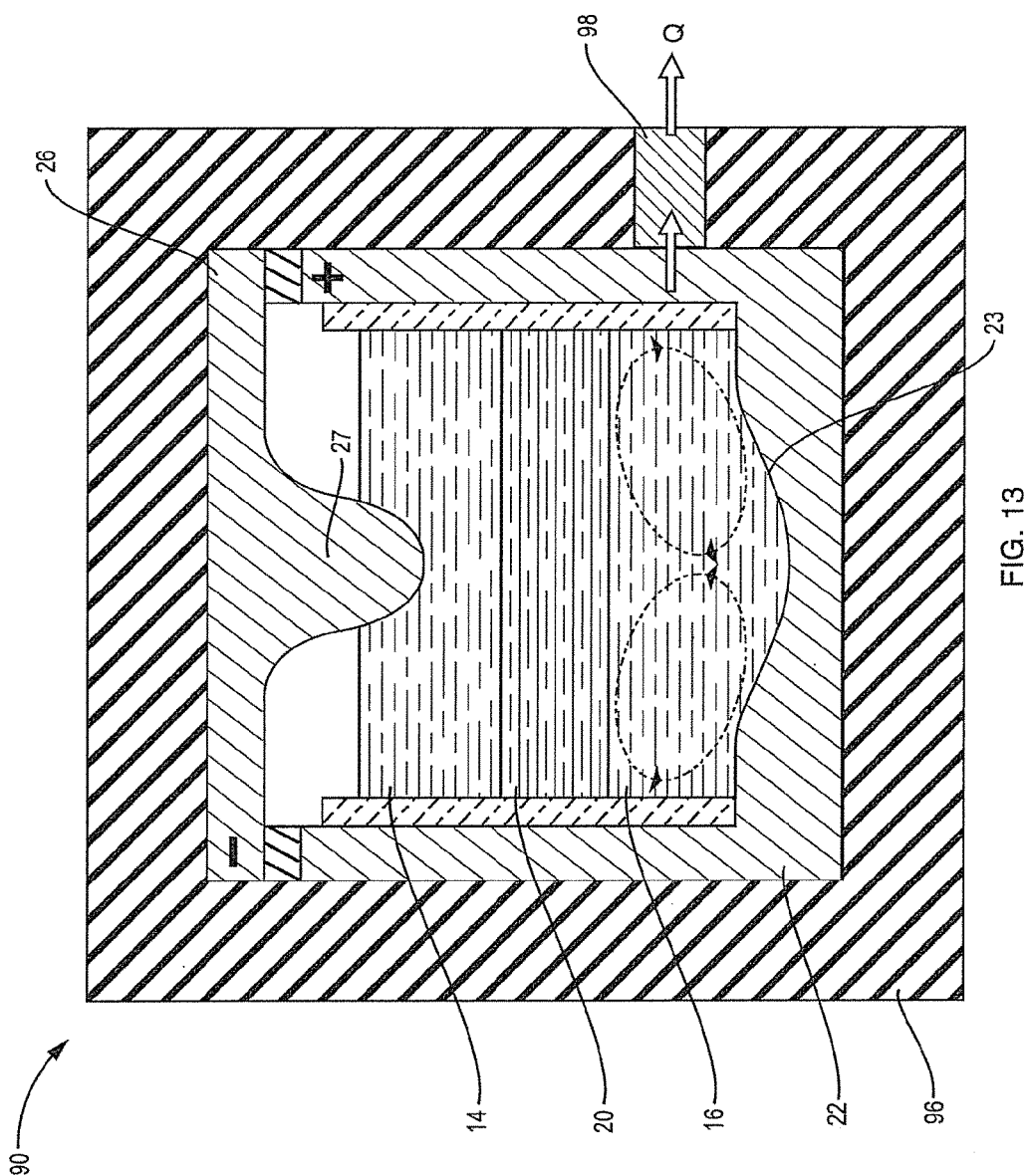

FIG. 13 illustrates another battery 90 similar to the one in FIG. 9 wherein a single thermal management device 98, e.g. a metal rod, is located at only one side of housing 96 at the level of one of the battery's liquid constituents, electrode layer 16 in this instance. This asymmetric removal of heat from the battery 90 still sets up gravity- or buoyancy-driven convection in the operative constituent, i.e., the electrode 16, as indicated in that figure. In fact, a thermal gradient may be produced in one or more of the battery's liquid constituents by employing a thermal management device 98 which includes a portion of the wall of the housing 96 that is thinner and/or has a smaller thermal conductivity at one side of container 22 than at another portion of the housing 96, such as another side. The liquid layer 16 on the less insulated side of the container 22 would then be cooler, and therefore more dense, than the liquid elsewhere in the container, which would cause it to sink, thereby promoting free convective mixing of the liquid material in the layer 16 as shown by the circular arrows in FIG. 13.

Figure 14:
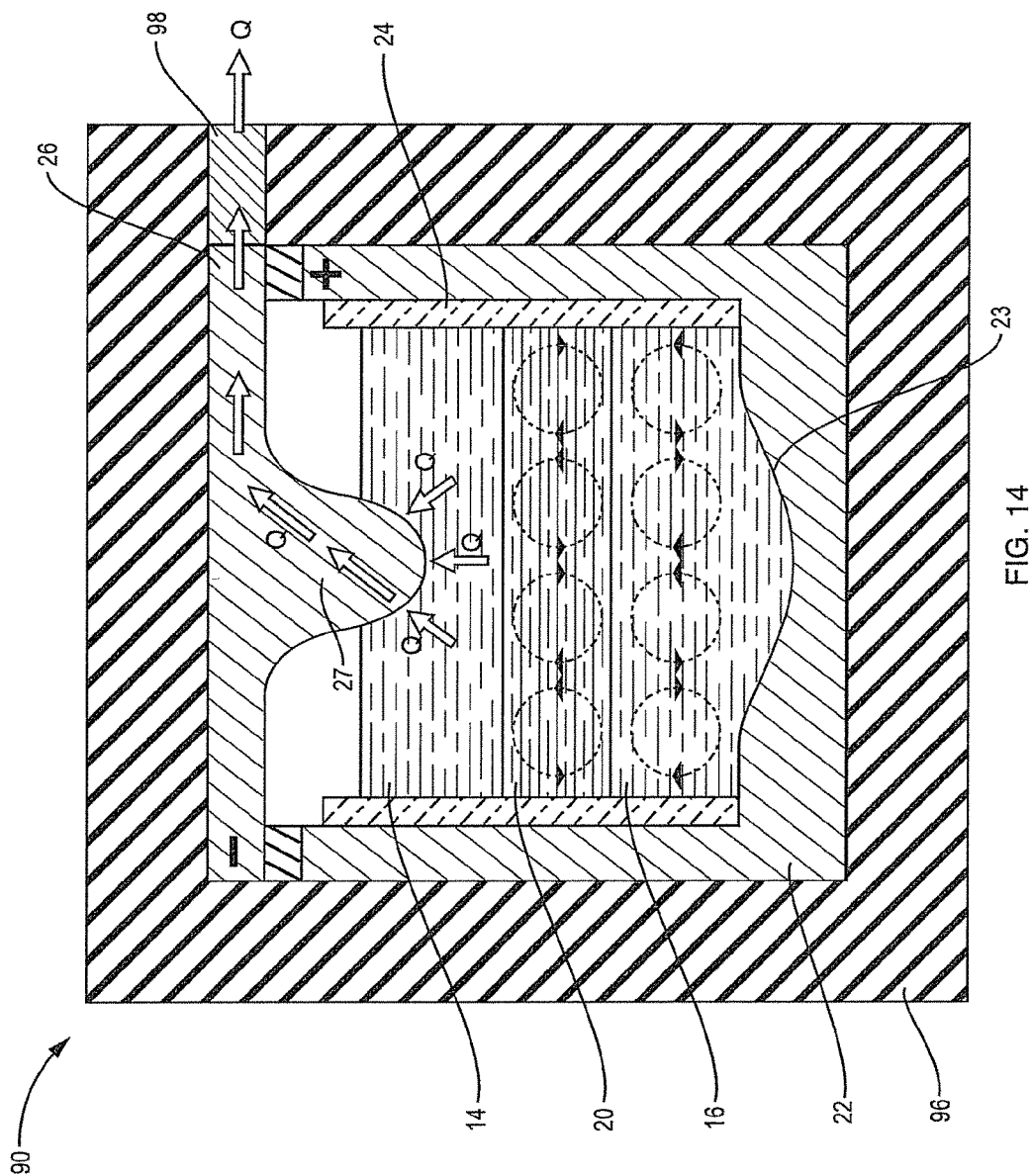

Refer now to FIG. 14, which illustrates an energy storage device or battery 90 wherein heat is extracted or dissipated from the contents of the container 22 via the device's lid 26 and negative current collector 27. In this case, a thermal management device 98, e.g., a metal rod or plate, extends through one side of the insulating housing 96 and is in contact with the lid 26. The lid 26 is in contact with the one of the electrodes which is disposed over the electrolyte 20, near the top of the container 22, illustratively the negative electrode 14. Heat (Q) is drawn from the electrode layer 14 via the lid 26 including its negative current collector 27 and the device 98. This creates a thermal gradient in the electrode layer 14 which creates free convection cells therein. These may, in turn, induce similar flow in the underlying electrolyte layer 20 as shown by the circular arrows in FIG. 13.

Figure 15:
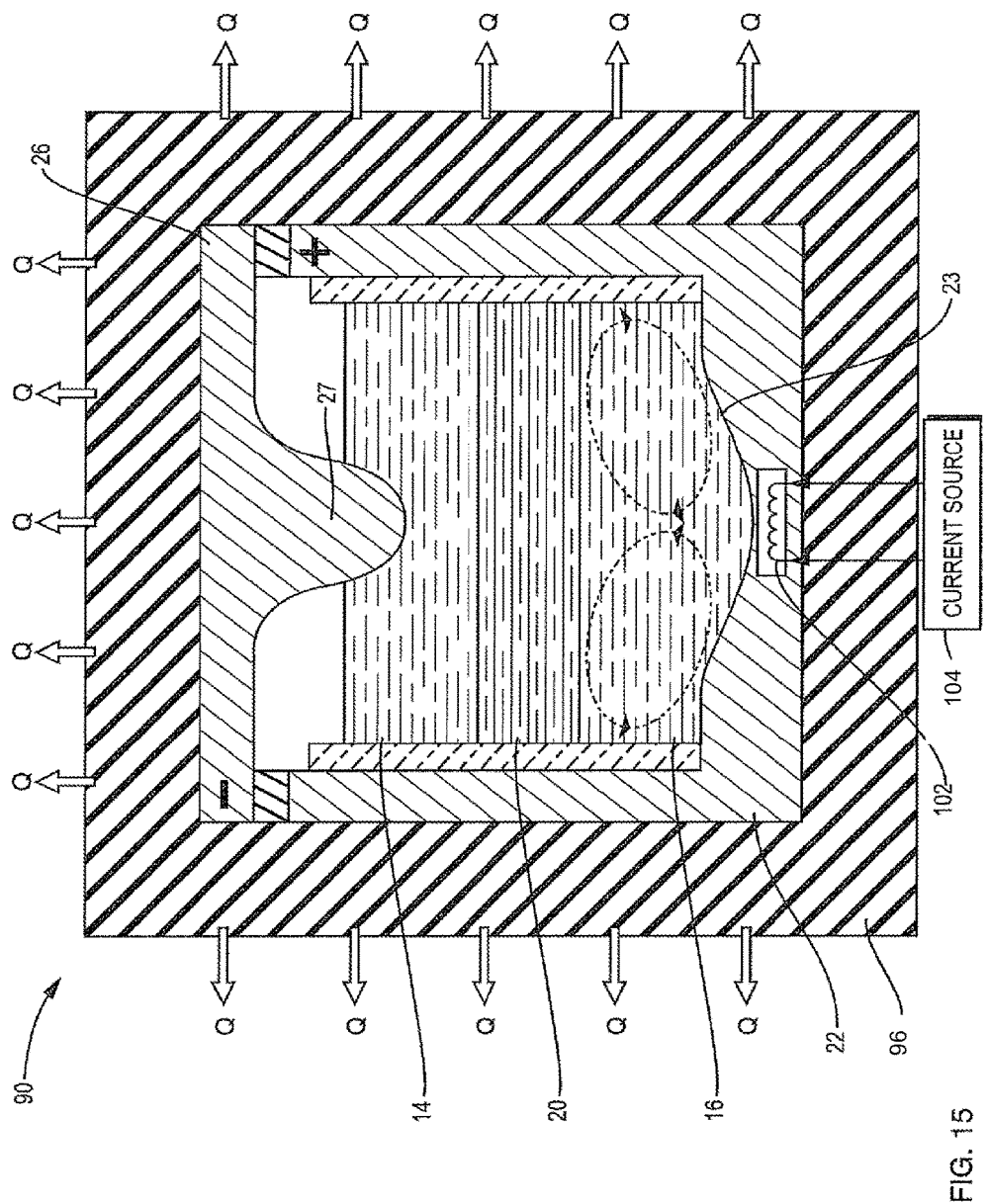
FIGS. 15-18 are vertical sections of battery embodiments, constructed in accordance with the invention, wherein one or more circulation cells are induced in at least one of the liquid constituents thereof by a circulation producer comprising different magnetic induction devices.

Turn now to FIG. 15, which shows a battery 90 wherein the thermal management device 98 introduces heat into one of the liquid constituents of the battery, herein the positive electrode layer 16, to supplement heat therein. In this embodiment, device 98 includes a heating element 102 in the bottom wall of the container 22 energized by leads extending through the bottom wall of the housing 96 to an external current source 104. Heat is dissipated through one or more of the walls of the housing 96 to promote the creation of convection cells in the electrode 16 as shown.

In the illustrative embodiments of the battery 90 shown, the convection cells created in one or another of the battery's liquid constituents are buoyancy- or gravity-driven convection cells caused by a thermal gradient produced by controlled management of thermal energy present in the battery.

In another approach to enhancing transport of reactive species or products in the illustrative batteries, magnetic induction caused by the current flowing when the battery is being charged or discharged induces flow in one or more of the liquid constituents. This type of circulation producer creates a current path to at least one of the current collectors 23 and 27 that gives rise to a magnetic field around or adjacent to that collector. The magnetic field produced coacts with the current in the electrode layer in contact with that collector to produce stirring force therein which circulates the liquid material of that layer. This circulation of liquid material may introduce material to and conveys material away from the associated electrode/electrolyte interface, thus enhancing the battery's current density and/or promoting desired electrochemical reaction. Various different current collector designs are disclosed which promote such circulation.

Figure 16:
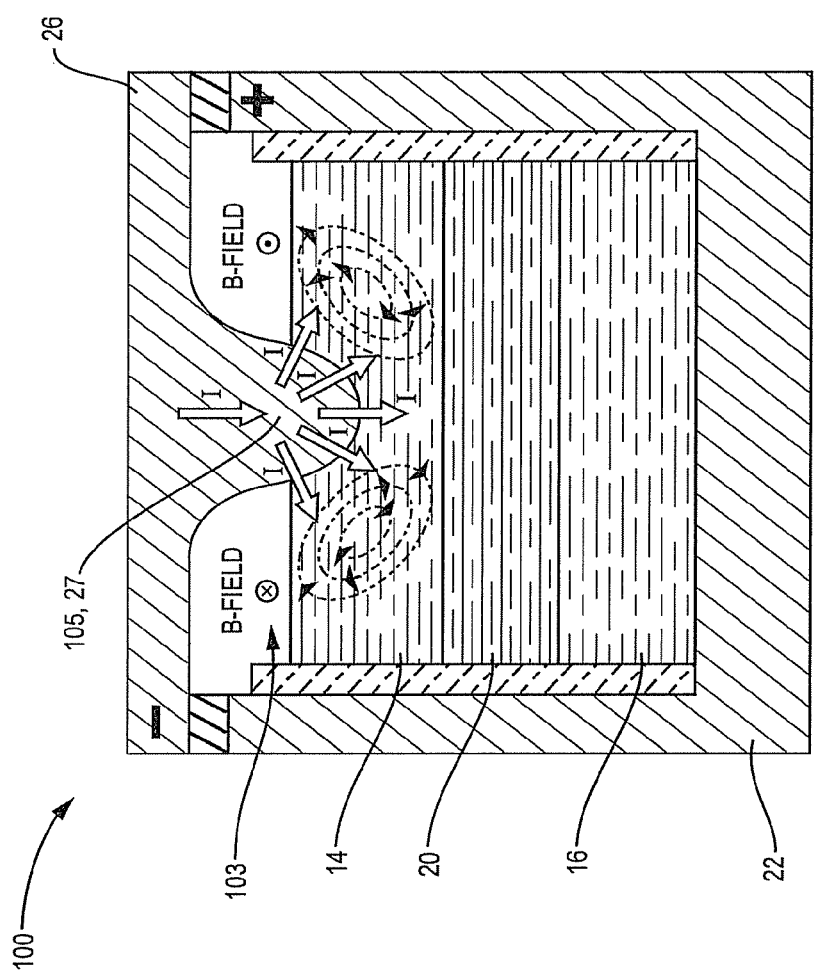

FIG. 16 illustrates a battery 100 incorporating a circulation producer comprising a magnetic induction device 103 in the form of a protrusion 105, for example a bulge or ridge, that protrudes from the lid 26 down into its electrode, i.e., the electrode layer disposed over the electrolyte 20, e.g. near the top of the container 22. Illustratively, the top electrode layer is the negative electrode 14. Thus, in this case, the protrusion 105 also constitutes the negative current collector 27. Again, the components of the battery 100 shown in FIG. 16 that are comparable to those in the battery embodiments depicted in FIGS. 8-15 bear the same identifying numerals.

When the battery 100 is being charged by an external power source (not shown) connected to the battery's positive 30 and negative 28 terminals (FIG. 2), electrons flow from the charging source via the lid 26 and its protruding negative current collector 27, 105 into the negative electrode layer 14. The protrusion 105 is shaped so that the current (I) therethrough produces an azimuthal magnetic field B more or less centered on the vertical axis of the protrusion and follows a divergent path into the electrode layer 14. The interaction of the magnetic field B with the horizontal component of the divergent charge carrier flow I in the electrode layer 14 produces a stirring force ($\vec{F}=q(\vec{V}\times\vec{B})$) in the electrode layer that causes the development of one or more circulation cells therein as indicated by the circular arrows in FIG. 16. This circulation may bring reactive material from the interior of the electrode 14 to its interface with electrolyte layer 20 and convey interface material to the interior as described above.

As in the other battery embodiments, the circulation in the layer 14 may, in turn, induce circulation of the underlying layer.

When the battery 100 is connected to an external load (not shown) and is discharging, the current flows in a reverse direction from that shown by arrows I in FIG. 16, converging into protrusion 105, creating a similar circulation of the liquid material in the electrode layer 14 that produces a similar effect.

Figure 17:
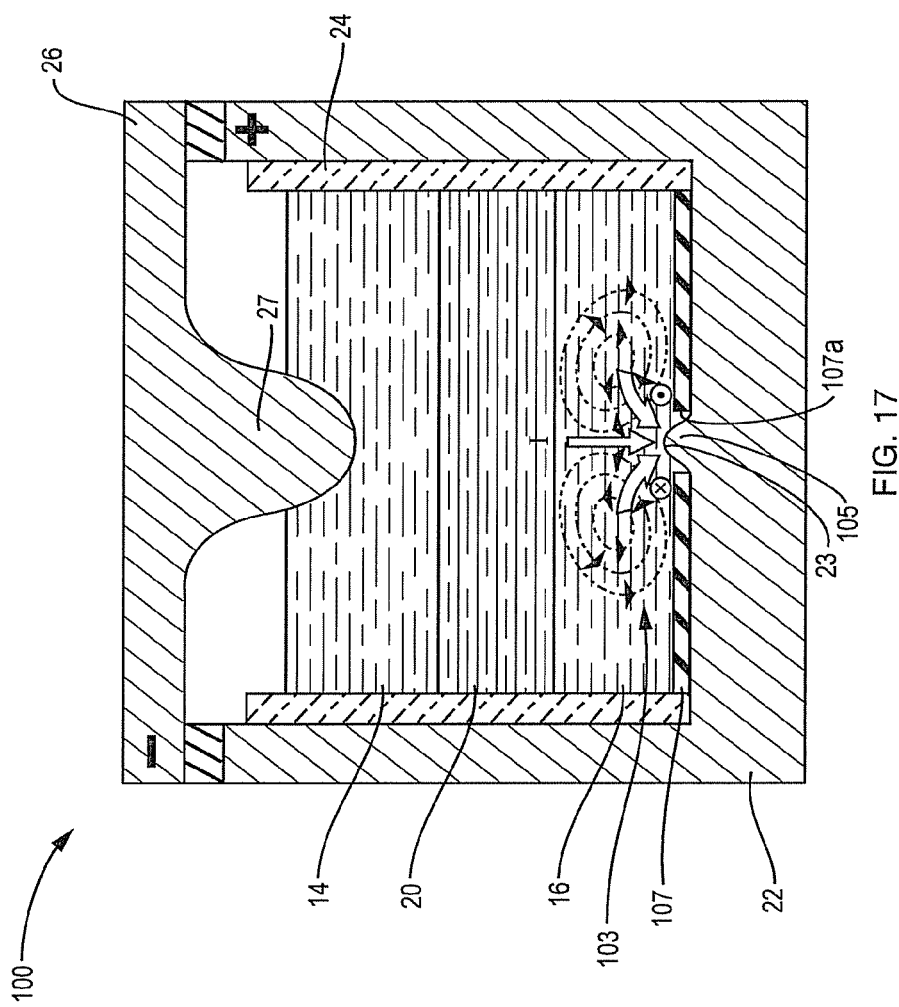

FIG. 17 illustrates a similar battery 100 wherein circulation cells are promoted in the electrode layer disposed under the electrolyte 20, e.g., at the bottom of the container 22, by the configuration of the electrode layer's respective current collector. Illustratively, the layer disposed under the electrolyte 20 is the battery's positive electrode layer 16. An induction device 103 in the form of a protrusion 105, such as a bulge or ridge, in the positive current collector 23 extends into the positive electrode 16. Here, the floor of container 22 is covered by an electrically insulating layer 107 that has a central opening 107a to provide clearance for the protrusion 105 and to confine the current flow thereto. The current through that protrusion 105 produces a magnetic field therearound which interacts with the divergent or convergent current flow in the layer 16 when the battery 100 is being charged or discharged to promote circulation of the liquid material in the electrode layer 16 in a manner similar to that produced in the electrode layer 14 of the battery 100 shown in FIG. 16.

In some applications, the magnetic induction devices in the batteries 100 depicted in FIGS. 16 and 17 may be combined in a single battery to promote circulation in both of the electrode layers 14 and 16 at the same time.

Figure 18:
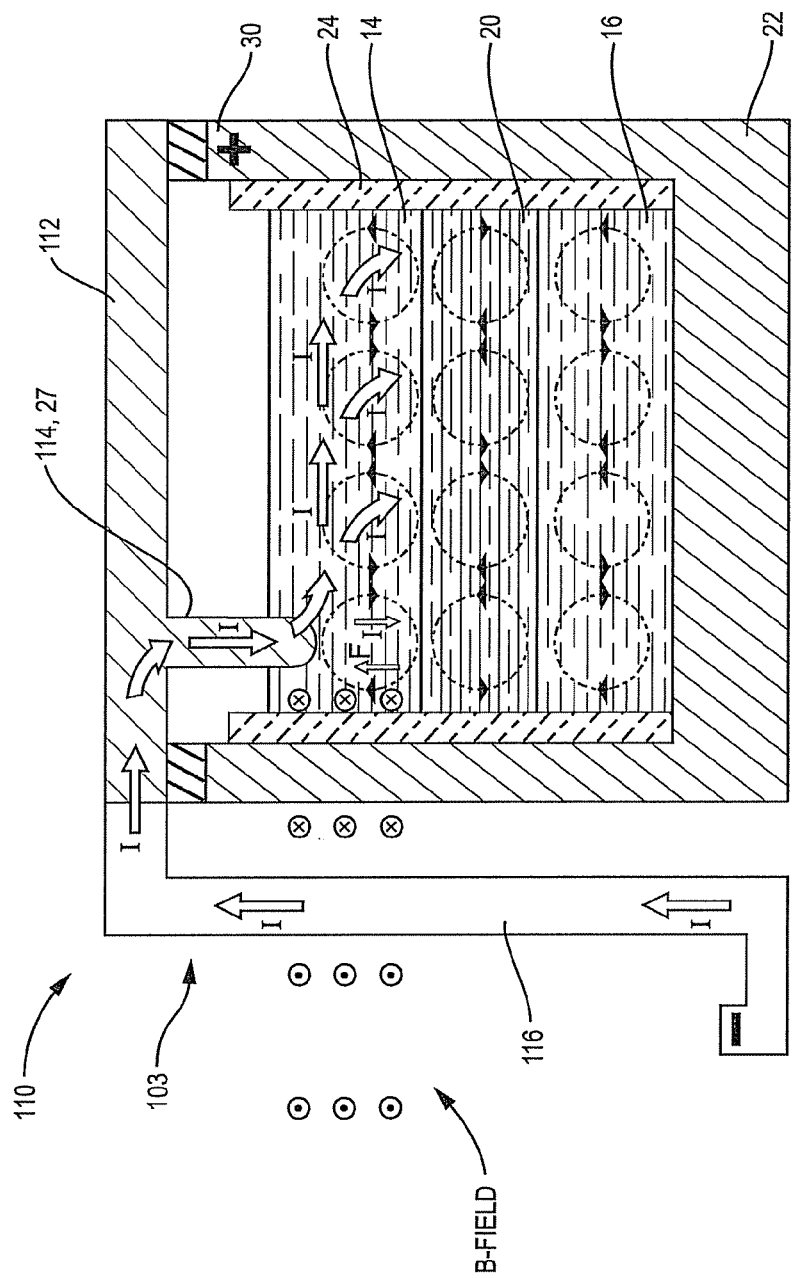

In FIG. 18, another battery embodiment 110 is depicted which produces circulation cells by magnetic induction in the electrode layer disposed over the electrolyte 20, e.g., near the top of the container 22. Illustratively, the electrode disposed over the electrolyte 20 is the negative electrode layer 14 of the battery 110. In this embodiment, the battery 110 has a circulation producer comprising a magnetic induction device 103 comprising a negative current collector having a more or less cylindrical protrusion 114 that extends down from cap 112 vertically into the electrode 14 at an off-center location in the container 22. Also, a negative terminal 116 is provided which has an upper end connected to the cap 112 and extends down vertically close to the side wall of the container 22, substantially parallel to the protrusion 114. The free, lower end of that terminal 116 is adapted to be connected to the positive terminal of a similar battery or other energy-exchanging device.

During a charging cycle, when electrons flow along the terminal 116 in the direction of arrows I to the protrusion 114 and into the electrode 14, a magnetic field B, the flux lines of which extend into the container 22 as shown in the drawing, is produced around the terminal 116. The magnetic field B interacts with the electrons flowing from the protrusion 114 into the electrode layer 14, producing a vertical stirring force F in that electrode which may circulate fresh material to and from the interface of the electrode 14 with the electrolyte layer 20 as described above. When the storage device 110 is discharging, with the current flowing in the reverse direction along the protrusion 114 and the terminal 116, similar circulation cells are formed in the layer 14.

The alkaline earth metal ion cell 10 (FIGS. 1-3), 50 (FIG. 4), 60 (FIGS. 5A and 5B.), 70 (FIG. 6) or 80 (FIG. 7), especially when equipped with circulation producing components such as shown in any of the batteries 90 (FIGS. 8-15), 100 (FIG. 16-17) or 110 (FIG. 18) may be capable of rapidly receiving and dispatching electricity, thereby bridging a supply-demand mismatch. The illustrative energy-storage cells may operate at extreme temperatures, such as arctic cold and desert heat, without restriction on geographical location and are realizable in a mobile structure. The power capacity is large, on the order of 10 $m^2$/MW, and scalable for adaptation to a variety of large-scale and commercial power management applications.

Several approaches are possible in expanding the capacity of the alkaline earth metal ion energy storage cell to adapt it to the requirements of large-scale applications, on the order of several MW. In one approach, scalability may be exploited in a single large alkaline earth metal ion energy storage battery unit by increasing the mass of the electrodes 14 and 16 and thereby increasing the mass of alkaline earth metal available for transfer within the cell. In another approach, a battery including many smaller alkaline earth metal ion units connected in series may confer a higher battery voltage more practically integrated with the power electronics necessary to serve on large-scale systems. In yet another approach a large array of units may be interconnected with series and parallel connections for increased robustness with respect to failure due to individual cell malfunction.

Figure 19:
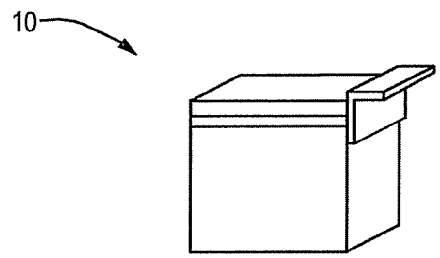
FIG. 19 is a perspective view showing a single alkaline earth metal ion energy storage battery unit constructed in accordance with the invention.
Figure 20:
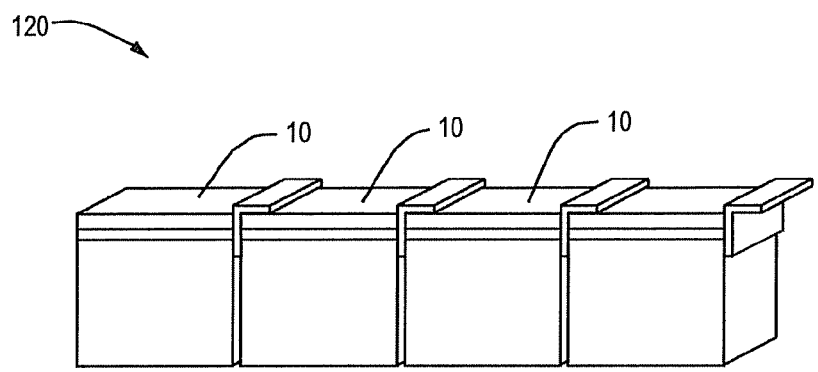
FIG. 20 is a perspective view showing a linear assembly of four battery units.
Figure 21:
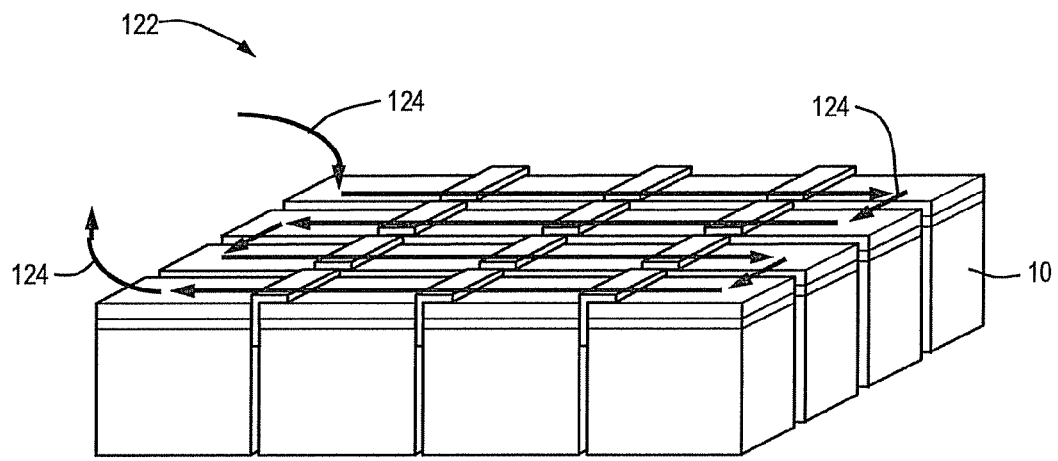
FIG. 21 is a perspective view showing a 16-unit array.

In one embodiment, a single alkaline earth metal ion battery unit 10 of the type shown in FIG. 1 is used to make a battery of more usable voltage in the following way. FIG. 19 shows in perspective view the cell 10 of the configuration type shown in FIG. 1. The cell 10 illustratively is a cube 10 cm long on each side. FIG. 20 shows a linear assembly 120 formed of four such battery units 10 connected in series. In FIG. 21, four linear assemblies 120 are joined to form an array 122 of 16 units 10 connected in series, in which the direction of electron movement during charging is indicated by arrows 124. Such arrays are illustratively stacked and electrically joined six high into modules of 96 cells to create a battery having an open-circuit voltage on the order of 100 V.

One potential use for the alkaline earth metal ion energy storage battery is at a large-scale power generator. The diurnal fluctuation in energy demand reduces plant efficiency, thereby increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods and then uploading power to the grid during times of higher demand, permitting the power plant to operate at a constant level.

A second potential use for the alkaline earth metal ion energy storage battery is at renewable energy source converters. Variability in supply makes management of power generated by renewable sources challenging. Sources such as wind and solar energy generate only intermittently. Without adequate power storage, additional power generators are needed on standby to operate in the event that the wind stops blowing or the sky clouds over. The underutilized capital in the form of excess power generators ultimately may limit the scale of deployment of renewable energy sources. A reliable high-capacity electrical storage device used in conjunction with a renewable energy source could provide dedicated load leveling thereby supporting implementation of renewable energy sources on grid. Such a combination could also support the use of intermittent renewable energy sources as an alternative to generators in remote, off-grid locations to which periodic delivery of fuel would be difficult.

A third potential use for the alkaline earth metal ion energy storage battery is in support of transmission lines. Transmission and distribution systems generally have no storage capacity, so the grid must meet instantaneous demand. As the load on a transmission line approaches its capacity, it incurs heavy ohmic losses which decrease its efficiency. Furthermore, the resulting resistive heating can melt system components and cause transmission line failure. Portable generators of the requisite power capacity (tens of MW) available to boost supply at the load center may be noisy, polluting, and require periodic refueling. Upgrading or replacing transmission lines as they reach capacity limits is very expensive and frequently meets with public opposition. Construction can take as long as five years.

A re-locatable alkaline earth metal ion energy storage unit located near a load center could supply a portion of the energy carried by the transmission line during peak hours of the day, thereby mitigating load demands on the line. Ideally, the storage unit would provide a significant portion, say at least 2% to 20% of the line's capacity, which is typically on the order of 500 MW. Such a unit could defer the need for a transmission line upgrade. Or, a portable alkaline earth metal ion energy storage unit could be deployed to supply emergency power after a system failure or to maintain power delivery during construction of new lines and then be relocated when no longer needed.

Distribution systems from load centers suffer similar problems, albeit at much lower loads, and could be similarly addressed using a portable power storage unit. Commercial consumers requiring a constant supply of electricity are especially vulnerable to blackouts. Auxiliary generators are less than ideal for backup because they require time to reach full output levels. These consumers would benefit from backup power systems, or uninterruptible power systems ("UPS") configured to provide electricity to such a facility in the event of a grid-power failure. A charged alkaline earth metal ion energy storage unit, configured to discharge when the power is interrupted, could function in that role.

Finally, a facility that is sensitive to voltage irregularities can be adversely affected by brownouts or other inconsistencies in delivered power. A UPS in the form of a charged alkaline earth metal ion energy storage unit, configured to discharge to eliminate deviations from the desired power level, could act as a buffer between the grid and the facility to ensure high power quality.

Although specific features of the invention are included in some embodiments and drawings and not in others, it should be noted that each feature may be combined with any or all of the other features in accordance with the invention.

It will therefore be seen that the foregoing represents a highly advantageous approach to energy storage, e.g., for large-scale and commercial energy management. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An energy storage device configured to exchange energy with an external device, the energy storage device comprising:
    a container having an electrically conductive portion;
    a lid that covers the container;
    a negative electrode disposed away from the container;
    a positive electrode in contact with the electrically conductive portion of the container;
    an electrolyte contacting the negative electrode and the positive electrode at respective electrode/electrolyte interfaces and contacting the electrically conductive portion of the container, wherein at least two of the negative electrode, the positive electrode, and the electrolyte comprise separate liquid materials within the container at an operating temperature of the energy storage device.

2. The energy storage device of claim 1, wherein, during charge/discharge, a thickness of the electrolyte remains substantially constant.

3. The energy storage device of claim 1, wherein the energy storage device has a power capacity greater than about 1 MW.

4. The energy storage device of claim 1, wherein the energy storage device comprises one or more cells, and wherein an individual cell comprises the negative electrode, the positive electrode and the electrolyte.

5. The energy storage device of claim 1, wherein (i) the negative electrode comprises calcium, magnesium, or a mixture thereof, (ii) the positive electrode includes a material selected from the group consisting of tin, lead, bismuth, antimony, tellurium, selenium, and combinations thereof, or (iii) the negative electrode comprises calcium, magnesium, or a mixture thereof, and the positive electrode includes a material selected from the group consisting of tin, lead, bismuth, antimony, tellurium, selenium, and combinations thereof.

6. The energy storage device of claim 1, further comprising a structure configured to hold the negative electrode away from the walls of the container.

7. The energy storage device of claim 6, wherein the structure comprises a contact portion comprising a mesh material folded into stacked layers, a mesh material coiled into a spiral, a mesh material coiled into a tube, a sponge, a cup, or a cage.

8. The energy storage device of claim 6, wherein the structure comprises a negative current collector, and wherein the structure is configured so that the negative electrode remains between the negative current collector and the electrolyte when the cell is fully discharged and at all times.

9. The energy storage device of claim 6, wherein the structure extends away from the lid in a direction that is substantially perpendicular to the lid.

10. An energy storage device, comprising:
    a container;
    a lid that covers the container;
    a negative electrode;
    a positive electrode; and
    an electrolyte contacting the negative electrode and the positive electrode at respective electrode/electrolyte interfaces, wherein the electrolyte is liquid at an operating temperature of the energy storage device, wherein the negative electrode, the positive electrode, or both are liquid at the operating temperature of the energy storage device, and wherein the negative electrode comprises an active alkaline earth metal and at least one additional negative electrode metal that is present at an amount that (i) decreases a melting point of the negative electrode or (ii) reduces a thermodynamic activity of the active alkaline earth metal in the negative electrode,
    wherein the at least one additional negative electrode metal include magnesium present at an amount that decreases the melting point of the negative electrode while diminishing the voltage of the cell by no more than about 0.1 V.

11. The energy storage device of claim 10, wherein each of the negative electrode, positive electrode and electrolyte is liquid at the operating temperature.

12. The energy storage device of claim 10, wherein:
(a) the energy storage device is coupled to (i) a power generator, (ii) an intermittent renewable energy converter, (iii) a load center on a transmission line, or (v) a distribution system coupled to a transmission line; or
(b) the energy storage device provides (i) load leveling, (ii) re-locatable power supply capacity coupled to a transmission line, (iii) backup or uninterruptible power for a load coupled to a distribution system, or (iv) power buffering between an electrical grid and a load.

13. The energy storage device of claim 10, wherein, during operation, the positive electrode comprises the active alkaline earth metal and at least two additional positive electrode elements, and wherein at least one of the at least two additional positive electrode elements reduces a thermodynamic activity of the active alkaline earth metal.

14. The energy storage device of claim 10, wherein, during operation, the positive electrode comprises the active alkaline earth metal and at least two additional positive electrode elements, and wherein at least one of the at least two additional positive electrode elements is tin, lead, bismuth, antimony, tellurium or selenium.

15. The energy storage device of claim 10, wherein, during operation, the positive electrode comprises the active alkaline earth metal and at least two additional positive electrode elements, and wherein the active alkaline earth metal (i) alloys with at least one of the at least two additional positive electrode elements upon discharge, (ii) de-alloys from at least one of the at least two additional positive electrode elements upon charge, or (iii) both alloys with at least one of the at least two additional positive electrode elements upon discharge and de-alloys from at least one of the at least two additional positive electrode elements upon charge.

16. The energy storage device of claim 10, wherein during operation, the positive electrode comprises the active alkaline earth metal and at least two additional positive electrode elements, and wherein at least one of the at least two additional positive electrode elements is present at an amount that adjusts a melting point of the positive electrode.

17. The energy storage device of claim 10, wherein the active alkaline earth metal is calcium.

18. The energy storage device of claim 10, wherein a concentration of the active alkaline earth metal in the negative electrode is (i) greater than about 20% on an atomic basis, (ii) less than about 80% on an atomic basis, or (iii) greater than about 20% on an atomic basis and less than about 80% on an atomic basis.

19. The energy storage device of claim 10, wherein the active alkaline earth metal is calcium, and wherein the electrolyte comprises a halide salt of calcium in an amount from about 5 mol % to about 50 mol %, wherein said halide salt of calcium conducts calcium from the electrolyte to the positive electrode or from the positive electrode to the electrolyte.

20. The energy storage device of claim 10, wherein the electrolyte comprises a salt of the active alkaline earth metal and a supporting electrolyte salt that suppresses dissolution of the active alkaline earth metal from the negative electrode into the electrolyte, and wherein the supporting electrolyte salt is ligand-donating.

21. The energy storage device of claim 10, wherein the electrolyte has an electrical conductivity of at least about 0.01 siemens/cm.

22. The energy storage device of claim 10, wherein the electrolyte comprises a mixture of a halide salt of the active alkaline earth metal and a halide salt of an alkali metal.

23. The energy storage device of claim 22, wherein the electrolyte comprises a mixture of calcium chloride with a halide salt of potassium or sodium, and wherein the halide salt of potassium or sodium comprises a chloride, an iodide or a bromide salt of potassium or sodium.

24. The energy storage device of claim 10, wherein the operating temperature is less than about 750° C., and wherein the melting point of the negative electrode is less than or equal to the operating temperature.

25. The energy storage device of claim 24, wherein the operating temperature is greater than about 300° C. and less than about 700° C.

26. The energy storage device of claim 10, wherein each of the negative electrode, the positive electrode and the electrolyte includes the active alkaline earth metal when the energy storage device is not fully charged, and wherein the positive electrode is nominally free of the active alkaline earth metal when the energy storage device is fully charged.

27. The energy storage device of claim 26, wherein the active alkaline earth metal is present in an elemental form in the negative electrode, an alloy form in the positive electrode and a salt in the electrolyte, and wherein the electrolyte comprises cations of the active metal.

\* \* \* \* \*